United States Patent
Gabbay et al.

(10) Patent No.: US 11,162,794 B2
(45) Date of Patent: Nov. 2, 2021

(54) METHOD, SYSTEM AND SOFTWARE FOR NAVIGATION IN GLOBAL POSITIONING SYSTEM (GPS)-DENIED ENVIRONMENTS

(71) Applicant: TREKACE TECHNOLOGIES LTD., Kfar Saba (IL)

(72) Inventors: Ronen Gabbay, Kfar Saba (IL); Tamir Leo Konotov, Kfar Saba (IL)

(73) Assignee: TREKACE TECHNOLOGIES LTD., Kfar Saba (IL)

( * ) Notice: Subject to any disclaimer, the term of this patent is extended or adjusted under 35 U.S.C. 154(b) by 137 days.

(21) Appl. No.: 16/331,976

(22) PCT Filed: Sep. 12, 2017

(86) PCT No.: PCT/IL2017/051026
§ 371 (c)(1),
(2) Date: Mar. 10, 2019

(87) PCT Pub. No.: WO2018/051337
PCT Pub. Date: Mar. 22, 2018

(65) Prior Publication Data
US 2019/0234740 A1 Aug. 1, 2019

Related U.S. Application Data

(60) Provisional application No. 62/393,666, filed on Sep. 13, 2016.

(51) Int. Cl.
*G01C 21/20* (2006.01)
*G01C 21/12* (2006.01)
(Continued)

(52) U.S. Cl.
CPC ............ *G01C 21/20* (2013.01); *G01C 21/12* (2013.01); *G01C 21/3652* (2013.01);
(Continued)

(58) Field of Classification Search
CPC ........ G01C 21/00; G01C 21/20; G01C 21/12; G01C 21/3652; G09B 21/00; G08B 7/066
See application file for complete search history.

(56) References Cited

U.S. PATENT DOCUMENTS

2008/0059061 A1* 3/2008 Lee .................. G01C 21/3461
701/412
2008/0195306 A1* 8/2008 Moinzadeh ...... G08G 1/096811
701/420

(Continued)

*Primary Examiner* — Tan Q Nguyen
(74) *Attorney, Agent, or Firm* — Eva Leah Taksel

(57) ABSTRACT

The present invention provides portable navigation systems, devices, methods and software for provision of navigation indications to a user in a GPS-denied environment, the system including at least one portable device, including a navigation Application (App) adapted to provide the user with navigational instructions and at least one interface component to provide at least one direction-specific instruction of movement to the user, wherein the App comprises an embedded algorithm adapted to fragment a continuous line course on a map associated with a two or three-dimensional route, the algorithm constructed to provide instructions to the user, responsive to a current position of the device associated with the route, wherein the at least one device is adapted to provide commands from the algorithm to activate the at least one vibrational components, responsive to a position of the device.

20 Claims, 23 Drawing Sheets

(51) Int. Cl.
*G01C 21/36* (2006.01)
*G01C 22/00* (2006.01)
G09B 21/00 (2006.01)
G01C 5/06 (2006.01)
G01C 17/00 (2006.01)

(52) U.S. Cl.
CPC ............ *G01C 22/006* (2013.01); *G01C 5/06* (2013.01); *G01C 17/00* (2013.01)

(56) References Cited

U.S. PATENT DOCUMENTS

| | | | |
|---|---|---|---|
| 2009/0195446 A1* | 8/2009 | Liao | G01S 19/252 |
| | | | 342/357.25 |
| 2011/0191024 A1* | 8/2011 | DeLuca | G01C 21/28 |
| | | | 701/472 |
| 2011/0208424 A1* | 8/2011 | Hirsch | G01C 21/165 |
| | | | 701/532 |
| 2011/0257882 A1* | 10/2011 | McBurney | G01S 19/47 |
| | | | 701/532 |
| 2013/0138264 A1* | 5/2013 | Hoshizaki | G01C 21/28 |
| | | | 701/1 |
| 2013/0166096 A1* | 6/2013 | Jotanovic | G01C 21/3617 |
| | | | 701/1 |
| 2013/0218456 A1* | 8/2013 | Zelek | G01C 21/20 |
| | | | 701/412 |

* cited by examiner

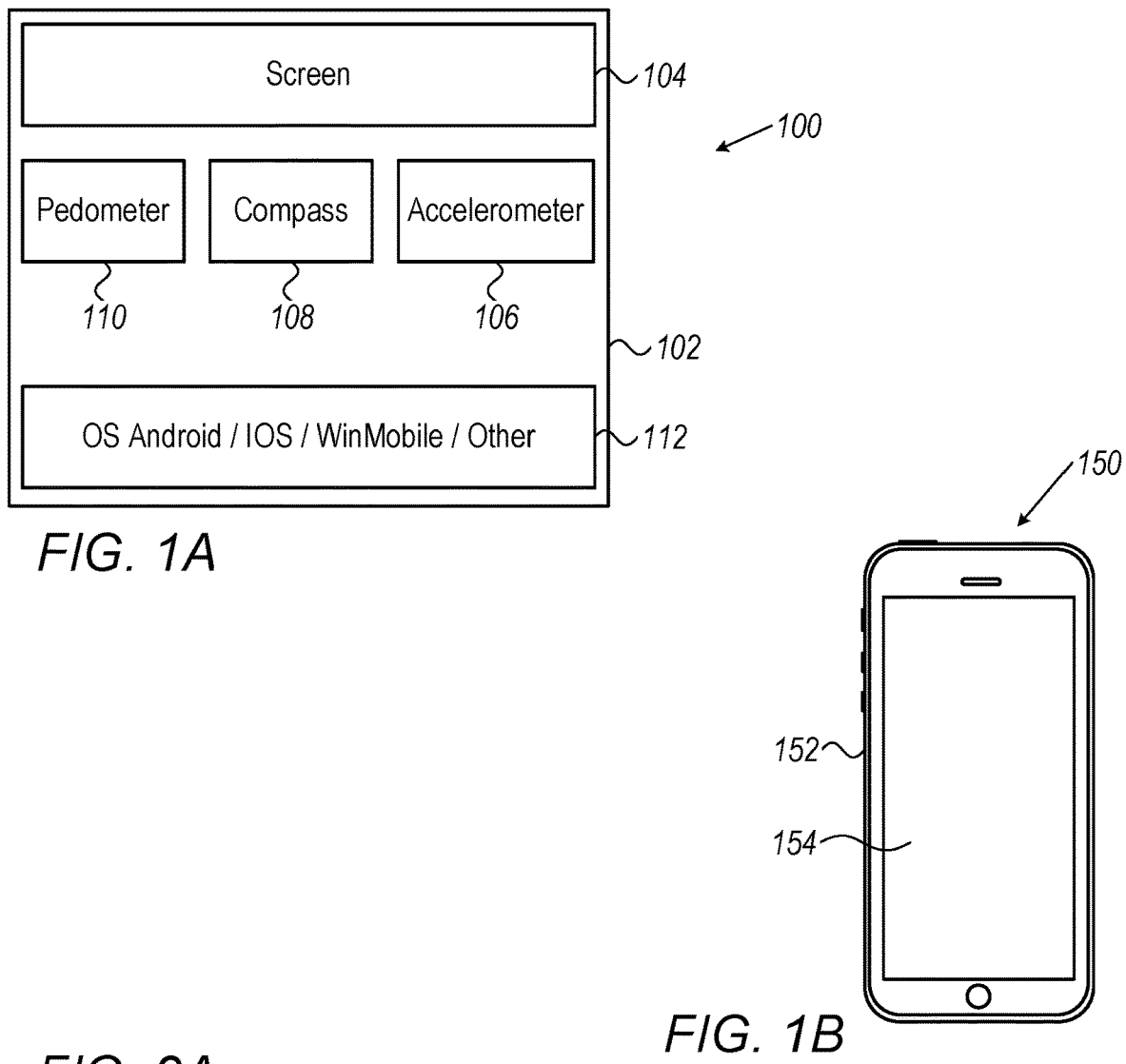
FIG. 1A
FIG. 1B
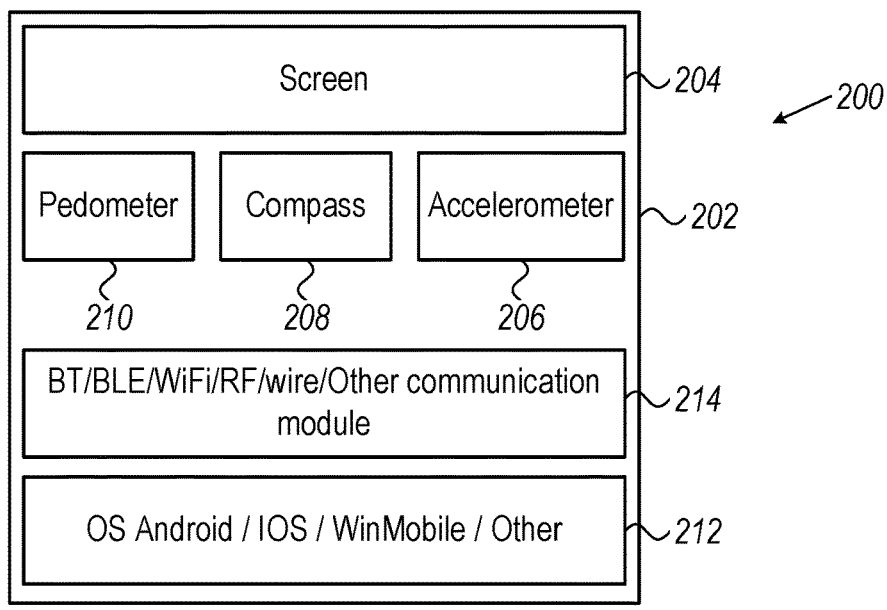
FIG. 2A

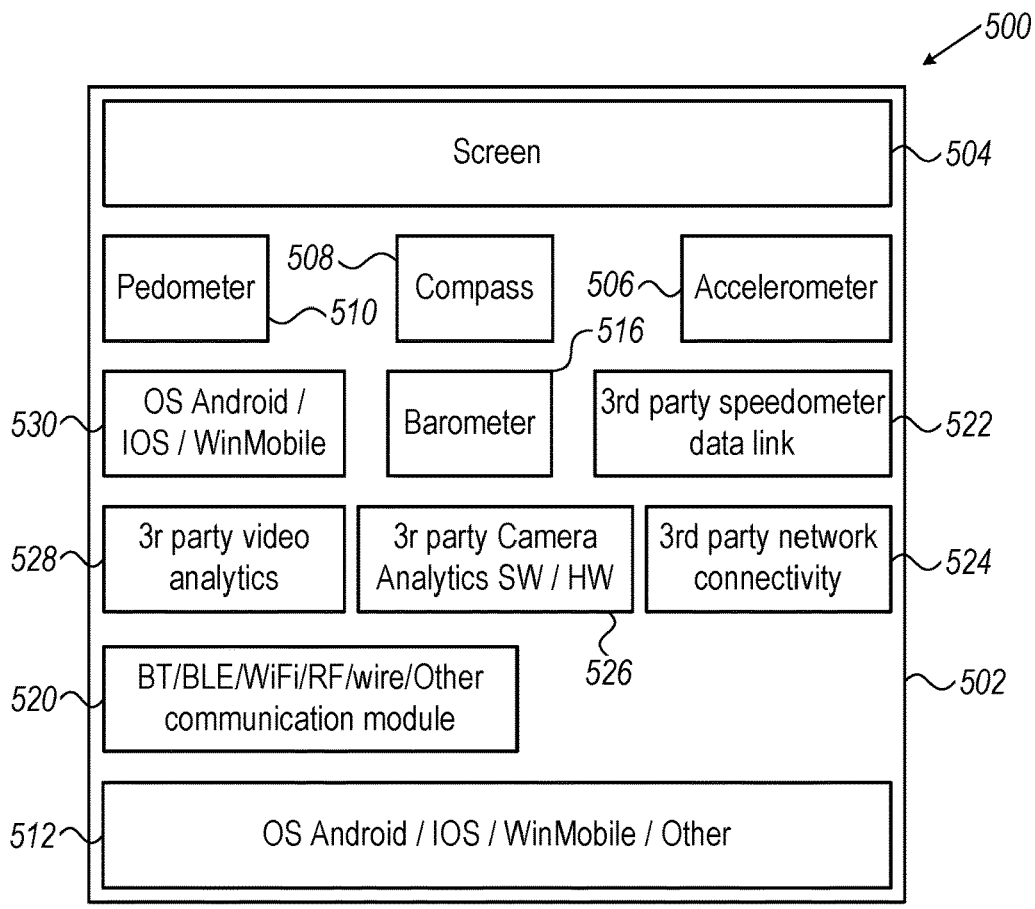
FIG. 5A
FIG. 5B
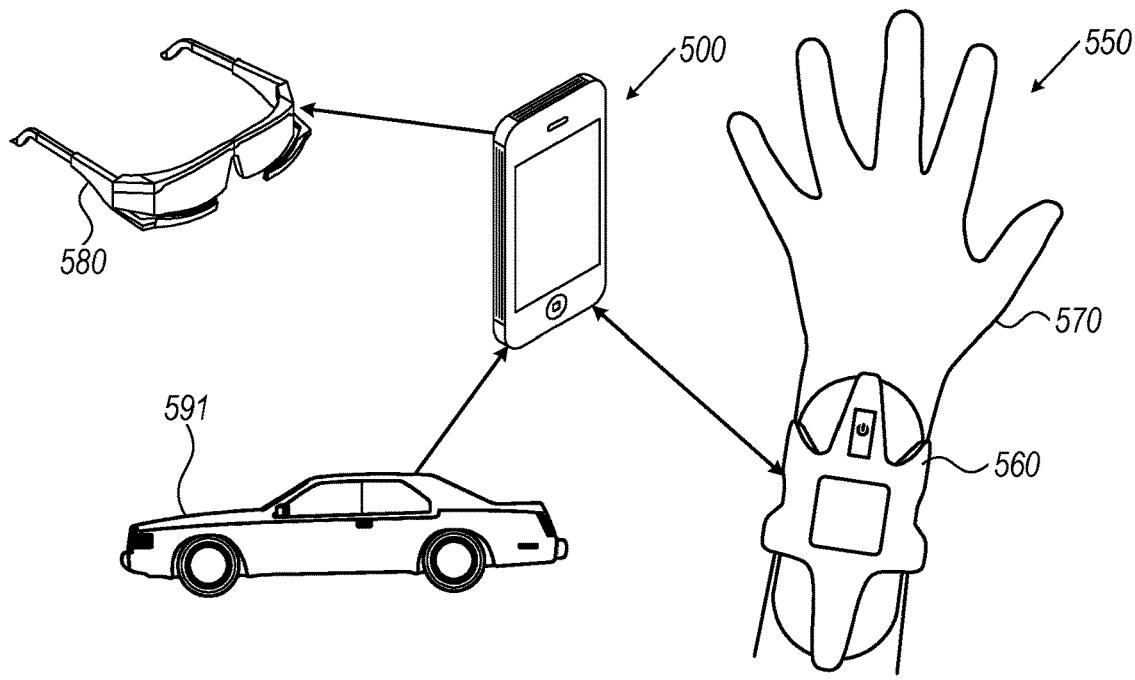

METHOD, SYSTEM AND SOFTWARE FOR NAVIGATION IN GLOBAL POSITIONING SYSTEM (GPS)-DENIED ENVIRONMENTS

FIELD OF THE INVENTION

The present invention relates generally to navigation systems and methods, and more specifically to methods and systems for navigation in Global Positioning Systems (hereafter, GPS)-denied environments.

BACKGROUND OF THE INVENTION

At present, most modern navigation applications and systems rely on GPS to determine the position of a user holding a computerized device with a supporting software application, onto a map.

These GPS-dependent computerized devices and supporting software applications enable the fundamental capability of the user to be aware of his/her current location on a map. Additional features and options on the device are also dependent on GPS signal availability. These may include directions, direction corrections, proximity alerts and the like.

When a GPS signal is lost, such as under covered areas (e.g. shopping malls, woods, urban, airports, etc.), or in military settings where the user's area of operation is jammed or spoofed (GPS-signal manipulation) by Electronic Warfare ((Hereafter, EW), a GPS-denied environment is created. Thus, the GPS-dependent computerized devices and supporting software applications cannot position the user on a map. Furthermore the GPS-dependent features mentioned hereinabove are no longer supported.

There is therefore an unmet need for improved methods, software and systems for navigation in Global Positioning Systems GPS (hereafter, GPS)-denied environments.

SUMMARY OF THE INVENTION

It is an object of some aspects of the present invention to provide improved devices, systems, software and methods for navigation in Global Positioning Systems GPS (hereafter, GPS)-denied environments.

In some embodiments of the present invention, improved methods, devices, device application (App) and apparatus are provided for providing instructions, without auditory or visual commands in Global Positioning Systems GPS (hereafter, GPS)-denied environments.

Some aspects of the present invention include a software application, installed on a computerized device, generating its raw attributes from the embedded sensors and Operational System software provided by the device (E.g. MS Windows, Android or iOS) in Global Positioning Systems GPS (hereafter, GPS)-denied environments.

The present invention provides portable navigation systems, devices, methods and software for provision of navigation indications to a user in a GPS-denied environment, the system including at least one portable device, including a navigation Application (App) adapted to provide the user with navigational instructions and at least one interface component adapted to provide at least one direction-specific instruction of movement to the user, wherein the App comprises an embedded algorithm adapted to fragment a continuous line course on a map associated with a two or three-dimensional route, the algorithm constructed to provide instructions to the user, responsive to a current position of the device associated with the route, wherein the at least one device is adapted to provide commands from the algorithm to activate the at least one component, responsive to a position of the device.

There is thus provided according to another embodiment of the present invention, a portable navigation device for provision of navigation indications to a user in a GPS-denied environment, the device including;
  i. a navigation Application (App) adapted to provide a user with navigational instructions; and
  ii. at least one interface component adapted to provide at least one direction-specific instruction of movement to the user.

In additional embodiments of the present invention, the App employs a fragmentation algorithm to segment a continuous-line course in, for example a GPX file format, from a starting point to a destination via a continuous line route, into a fragmented, straight, clear, bearings stretched between clear waypoints, to provide the user with easy following of azimuths (bearings) between the waypoints, and further to provide the user with heading instructions such as, but not limited to, "turn 22.5 degrees left", "turn 45 degrees to the right".

According to further embodiments of the present invention, the navigational App employs a non-GPS roaming algorithm, enabling a user, roaming along an "unplanned" route, to provide the user with correct user positional data in continuously in real-time.

According to some embodiments, the at least one interface component impacts on a specific area of the user's body to provide the at least one direction-specific instruction.

In other embodiments of the present invention, a method, device, device-application (App) and system is described for providing tactile instructions, without auditory or visual instructions in Global Positioning Systems GPS (hereafter, GPS)-denied environments.

In further embodiments of the present invention, the method, device, device-application (App) and system are provided for navigation in GPS-denied environments, the method and device-application (App) including a fragmentation algorithm for fragmenting a route/track of a user to arrive at a target/destination, with or without GPS, the algorithm being configured to reduce deviation, errors and mistakes on route of the user. The error reduction is achieved by updating instructions to the user in real-time, continuously, semi-continuously or intermittently, responsive to the errors detected. The error reduction allows the user to arrive at the target/destination with less than 100 meters, 50 meters, 10 meters, 5 meters, 1 meter or less deviation therefrom. The algorithm is further adapted to sample step size, step rate and/or other parameters, associated with movements of the user and to provide real-time personalized feedback and instructions to the user to minimize user deviation from the track/route.

According to some embodiments of the present invention, the device-application (App) algorithm is operative to adjust (typically increase) the number of fragments of a given route and/or user movement samples when the user deviates from the route, thereby effecting a more accurate update to the user to return him/her to the route/track and to target the user more precisely and accurately to his/her destination/target.

According to some further embodiments of the present invention, the device is placed on the user in a central anterior position, often within a piece of clothing or in a bag or pouch. The central position of the device allows for a further reduction in error of the user, by reducing the user directional error, thereby further reducing bearing deviation of the user in the route/track required for him/her to arrive at his/her destination/target.

According to further embodiments of the present invention, the device is placed on the user in a central anterior position along a vertical central axis of the user's body (may be on his chest or back), often within a piece of clothing or in a bag or pouch. The optimized position of the device allows for yet a further reduction in directional error of the user, According to further embodiments of the present invention, the device App provides the user with a real-time, on screen, on-map popup notification on the device, thereby providing the user with distance, direction, and a description of the next way point thus the user is able to confirm that he/she is actually located at a place/position, which the App software shows, thereby improving user location accuracy and awareness.

According to further embodiments of the present invention, the device App's algorithm in GPS-denied environments, is operative to correct erroneous data provided by the computerized device's sensors or by its operational system and thus to further provide a precise location on a trek where there is a pre-planned route, on a free route/roaming trek, on a 3-dimensional navigation, such as in buildings. The algorithm is suitable for walking, running, driving (including autonomous tools) and any other suitable movement types of the user.

In additional embodiments of the present invention, a method is described for providing tactile instructions from a device placed on an arm of a user in Global Positioning Systems GPS (hereafter, GPS)-denied environments.

According to further embodiments, the present invention provides portable navigation systems and associated methods, for provision of navigation indications to a user in a GPS-denied environment, the system including at least one portable device, the device includes at least four tactile stimulus components, each component disposed on an inner face of the device, each on an end portion of an extremity of a body of the device, each component adapted to impact on a specific area of skin of a user to provide at least one direction-specific instruction of movement to the user and an embedded algorithm in the device, adapted to fragment a continuous line course on a map associated with a two or three-dimensional route, the algorithm constructed to provide instructions to the user, responsive to a current position of the device associated with the route, wherein the at least one device is adapted to provide commands from the algorithm to activate the at least four tactile stimulus components, responsive to a position of the device.

The present invention may also include a wearable device as the physical interface or guidance monitor to the user, for use in Global Positioning Systems GPS (hereafter, GPS)-denied environments.

The present invention methods solve the limitation of deviation from the true bearing by employing an innovative fragmentation algorithm to segment the continuous-line course to straight, clear, bearings stretched between waypoints and thus to enable easy following of azimuths (bearings) between waypoints, and to provide the user with heading instructions, such as "turn 22.5 degrees left", "turn 45 degrees to the right".

The software application of the present invention also eases the navigation strain and further assures the accuracy of the navigating user's location by enabling the user to name waypoints with descriptive names and thus to assist him in identifying waypoints' landmarks. By that, and if needed, the user gains location-awareness and can pin his actual location on the map, to than zero the distance count and thus to prevent the exponential deviation of distance.

The application may also employ image comparison algorithm, using the computerized device's camera or an attached camera, in order to compare stored images of landmarks to routes' landmarks and thus to zero distance measurement.

According to some embodiments of the present invention, the system comprises software.

According to some embodiments of the present invention, devices of the present invention utilize an algorithm which continuously (1) corrects the faulty measurements by the sensors (2) recognizes the changes in strides length due to the objective and subjective factors (3) recognizes the orientation changes performed by the user (4) recognizes the changes in tempo of movement (slow walking, walking, jogging, running, etc.) and integrating these changes into the measurement as well.

As the fragmentation algorithm enables clear bearings and thus providing clear instructions to the user, and the integration of wearable device (head-up-display glasses, smartwatch, screens, tactile bands, etc.) with the application provides immediate correction alerts to the user and thus the user walks less out-of-azimuth and thus will generate less incremental and exponential mistakes. Moreover, it provides a hands-free navigation experience.

In yet further additional embodiments of the present invention, a method is described for providing tactile instructions from a device placed over a forearm of a user in a Global Positioning Systems GPS (hereafter, GPS)-denied environment.

In further additional embodiments of the present invention, a method is described for providing tactile instructions from two devices, each placed on a forearm of a user in a Global Positioning Systems GPS (hereafter, GPS)-denied environment.

The present invention provides, according to some embodiments, a portable device, which according to some embodiments is a cell phone device and/or wearable navigation forearm-band for intuitive navigation at sport, extreme, and military scenarios and conditions. The device guides and leads a user or a group of users, such as a hiker, a hunter, an athlete or a soldier to his destination. The device is constructed and configured to provide tactile instructions, without distractions and with optimal considerations to the extreme circumstances and conditions that the user is experiencing in a Global Positioning Systems GPS (hereafter, GPS)-denied environment.

According to some embodiments of the present invention, there is provided a computerized mobile device (such as a cellphone, laptop, tablet, Smartphone or the like) carried by the user, which is adapted to process navigation information, and that is adapted to communicate by wired and/or wireless connection with at least one device. The device may be, according to some embodiments, a forearm-band sensation device for use in a Global Positioning Systems GPS (hereafter, GPS)-denied environment.

The forearm-band sensation device is specifically invented, designed and developed to deal with the extreme circumstances and conditions users are experiencing in sport, extreme and military navigation scenarios and conditions, as well as assisting disabled users, such as the blind, aged and Alzheimer's disease patients trying to navigated while at clinical extreme circumstances and conditions in a Global Positioning Systems GPS (hereafter, GPS)-denied environment.

According to some embodiments of the present invention, the device is adapted to be forearm-mounted, leaving ones hands totally free for any other task in a Global Positioning Systems GPS (hereafter, GPS)-denied environment.

According to some embodiments of the present invention, the device is multi-sensory. It vibrates and flashes to ergonomically guide the user. It is simple and provides clear instructions, which assist one, without superfluous data. It is shockproof and water-resistant. It is designed and built to withstand harsh environments. The design thereof is intuitive, being simple understand and operate. It is safe and provides distraction-free navigation, eliminating a requirement to stop and look at a map and/or focus on complex signals, in a Global Positioning Systems GPS (hereafter, GPS)-denied environment.

According to some embodiments of the present invention, the device provides covert night-time navigation support, as the light indicators can be disabled to remain night-covert, that is, navigation without the need for any sound and/or visual indications. Thus by turning off the led emitters, the user may navigate while covert, silent and with no light exposure. The device comprises long-life life batteries for more than 24 hours operation in normal usage and the batteries may be rechargeable, in a Global Positioning Systems GPS (hereafter, GPS)-denied environment.

According to some embodiments of the present invention, the device's revolutionary six directional arms' operational layout is geared to achieve optimal distance between the sensations, enabling the user to easily differentiate between the physical directions' instructions, and further to provide 360 degree bearing coverage, in a Global Positioning Systems GPS (hereafter, GPS)-denied environment.

According to some additional embodiments of the present invention, the device comprises at least one tactile stimulus provider such as a micro-vibrator an electric vibes provider, a skin scratching element and the like, and combinations thereof, placed on the tip of each directional arm and the vibrations are ergonomically funneled to a specific point on the users forearm; resulting in a feel akin to being poked in the skin, as if someone was physically pointing and leading you, in a Global Positioning Systems GPS (hereafter, GPS)-denied environment.

This extraordinary layout creates a natural, intuitive user experience (UX), as the user can immediately use it without studying or training. The revolutionary design and intuitive user experience (UX) combination yields an efficient, practical navigation methodology by which, and based on the speed of the user, the device physically indicates and alerts the user before a required turn and where to head straight on in a Global Positioning Systems GPS (hereafter, GPS)-denied environment.

According to some additional embodiments of the present invention, the device is suitable for use in a defense setting. It is suitable for situational awareness challenges; field performance, stealth support and seamless implementation in a Global Positioning Systems GPS (hereafter, GPS)-denied environment.

According to some additional embodiments of the present invention, the device is suitable for use in military navigation (Day/Night), in which the user is subjected to harsh field conditions and to the elements. He/she may be carrying heavy equipment, may be stressed by time constrains and needs to be attentive to the surroundings and to stealth requirements in a Global Positioning Systems GPS (hereafter, GPS)-denied environment.

Situational Awareness—The user needs to be in constant awareness of its definite location, location on a trail, time/ distance countdowns, environment information, the locations and position of his team-mates, and the like.

There is thus provided according to an embodiment of the present invention, a portable navigation system for provision of navigation indications to a user in a GPS-denied environment, the system including;
  a. at least one portable device including;
    i. a navigation Application (App) adapted to provide a user with navigational instructions; and
    ii. at least one interface component adapted to impact on a specific area of skin of a user to provide at least one direction-specific instruction of movement to the user;
  wherein the App includes an embedded algorithm adapted to fragment a continuous line course on a map associated with a two or three-dimensional route, the algorithm constructed to provide instructions to the user, responsive to a current position of the device associated with the route, wherein the at least one device is adapted to provide commands from the algorithm to activate the at least one interface components or sensors, responsive to a position of the device.

Additionally, according to an embodiment of the present invention, the at least one computerized device is for placing in an anterior central position on a body of the user.

Furthermore, according to an embodiment of the present invention, the at least one device includes at least one of a portable phone, an armband device, a heads-up device, a smart glasses device and combinations thereof.

Further, according to an embodiment of the present invention, the at least one device includes at least one of a screen, an interactive screen, a pedometer a compass, and accelerometer, Operating System Software OS Android/IOS/Winmobile/other, a GPS service, at least one of BT/BLE/WiFi/RF/wire/$3^{rd}$ party proprietary communication component modules, a barometer, a wireless/cellular network component, a $3^{rd}$ party speedometer data link, third party camera analytics SW/HW element, a third party video analytics component and combinations thereof.

Yet further, according to an embodiment of the present invention, the at least one device includes at least four of a screen, an interactive screen, a pedometer a compass, and accelerometer, Operating System Software OS Android/IOS/Winmobile/other, a GPS service, at least one of BT/BLE/WiFi/RF/wire/$3^{rd}$ party proprietary communication module, a barometer, a wireless/cellular network component, a Bluetooth component a $3^{rd}$ party speedometer data link, third party camera analytics SW/HW element, a third party video analytics component and combinations thereof.

Furthermore, according to an embodiment of the present invention, the at least one device includes at least seven of a screen, an interactive screen, a pedometer a compass, and accelerometer, Operating System Software OS Android/IOS/Winmobile/other, a GPS service, at least one of BT/BLE/WiFi/RF/wire/$3^{rd}$ party proprietary communication module, a barometer, a wireless/cellular network component, a Bluetooth component a $3^{rd}$ party speedometer data link, third party camera analytics SW/HW element, a third party video analytics component and combinations thereof.

Additionally, according to an embodiment of the present invention, the App is operative to activate at least one of the screen, the interactive screen, the pedometer, the compass, and the accelerometer, the Operating System Software OS Android/IOS/Winmobile/other, the GPS service, the at least one of BT/BLE/WiFi/RF/wire/$3^{rd}$ party proprietary the communication module, the barometer, the wireless/cellular network component, the Bluetooth component, the 3rd party speedometer data link, the third party camera analytics SW/HW element and the third party video analytics component to compare real-time data associated with a real-time location of the at least one device with an anticipated location of the at least one device to provide the user with updated real-time instructions, responsive to the real-time data and the anticipated location.

Moreover, according to an embodiment of the present invention, the at least one device includes all of an interactive screen, a pedometer a compass, and accelerometer, Operating System Software OS Android/IOS/Winmobile/other, a GPS service, at least one of BT/BLE/WiFi/RF/wire/$3^{rd}$ party proprietary communication module, a barometer, a wireless/cellular network component, a Bluetooth component a $3^{rd}$ party speedometer data link, third party camera analytics SW/HW element and a third party video analytics component, an interface to CAD and $3^{rd}$ party 3d SW.

Additionally, according to an embodiment of the present invention, the arm band device includes at least four tactile stimulus components.

Furthermore, according to an embodiment of the present invention, the at least four tactile stimulus components are vibration elements, each adapted to vibrate on the specific area of skin on the forearm, wherein the specific areas of skin are disposed at least 2 cm away one from the other.

Further, according to an embodiment of the present invention, the device App is configured to activate different tactile stimulus components to instruct the user with different instructions.

Additionally, according to an embodiment of the present invention, the at least one portable device extremities include flexible arms.

Furthermore, according to an embodiment of the present invention, the flexible arms each includes a visual stimulus component disposed therein.

Moreover, according to an embodiment of the present invention, each the visual stimulus component includes at least one light emitting diode (LED) or other light devices (not LED).

Additionally, according to an embodiment of the present invention, at least one of the at least one light emitting diode (LED) is configured to be activated by the device App responsive to the position of the user.

Furthermore, according to an embodiment of the present invention, at least one of the at least one light emitting diodes (LED) is configured to be activated by the device App apparatus responsive to the position of the user.

Additionally, according to an embodiment of the present invention, the navigation system further includes at least one additional communication apparatus, the at least one additional communication apparatus is selected from a cell phone, smart glasses, a heads up display (HUD), an optical apparatus, smartwatch, binoculars, camera equipment, a smart phone, a tablet, a laptop computer, a mobile communication apparatus, a portable communication apparatus, a radio phone and an army phone.

Moreover, according to an embodiment of the present invention the at least one portable device weighs less than 300 grams.

There is thus provided according to another embodiment of the present invention, a portable navigation system for provision of navigation indications to a user in a GPS-denied environment, the system including;
a. a cellphone device including;
iii. a navigation Application (App) adapted to provide a user with navigational instructions; and
iv. at least one interface component adapted to provide at least one direction-specific instruction of movement to the user; and
wherein the App includes an embedded algorithm adapted to fragment a continuous line course on a map associated with a two or three-dimensional route, the algorithm constructed to provide instructions to the user, responsive to a current position of the device associated with the route, and wherein the at least one device is adapted to provide commands from the algorithm to activate the at least one interface components, responsive to a position of the device; and wherein
b. a cellphone carrying element selected from a pouch, a bag, a pocket and piece of clothing, the cellphone carrying element configured to be placed on an anterior central position of a body of the user.

There is thus provided according to another embodiment of the present invention, a portable navigation method for provision of navigation instructions to a user in a GPS-denied environment, the method including;
a. providing the user with a cellphone device including at least one interface components and a navigation Application (App) adapted to provide a user with the navigational instructions; and
b. activating the App including an embedded algorithm to fragment a continuous line course on a map associated with a two or three-dimensional route, the algorithm constructed to provide instructions to the user, responsive to a current position of the device associated with the route, and wherein the device is adapted to provide commands from the algorithm to activate the at least one interface component, responsive to a position of the device.

An algorithm in GPS-denied environments, according to some embodiments of the present invention, is operative to correct erroneous data provided by the computerized device's sensors or by its operational system and thus to further provide a precise location on a trek where there is a pre-planned route, on a free route/roaming trek, on a 3-dimensional navigation, such as in buildings. The algorithm is suitable for walking, running, driving (including autonomous tools) and any other suitable movement types of the user.

There is thus provided according to another embodiment of the present invention, a computer software product, the product configured for provision of navigation instructions to a user in a GPS-denied environment, the product including a computer-readable medium in which program instructions are stored, which instructions, when read by a computer, cause the computer to;
a. provide the user with the navigational instructions; and
b. activate an embedded algorithm to fragment a continuous line course on a map associated with a two or three-dimensional route, the algorithm constructed to provide instructions to the user, responsive to a current position of the user associated with the route, and wherein the software product is adapted to provide commands from the algorithm to activate the at least one interface component on a device associated with the user, responsive to a current position of the device.

According to further embodiments of the present invention, the device App's algorithm in GPS-denied environments, is operative to correct erroneous data provided by the computerized device's sensors or by its operational system and thus to further provide a precise location on a trek where there is a pre-planned route, on a free route/roaming trek, on a 3-dimensional navigation, such as in buildings. The algorithm is suitable for walking, running, driving (including autonomous tools) and any other suitable movement types of the user.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a simplified schematic illustration of a device for navigation in a non-Global Positioning System (GPS) environment, in accordance with an embodiment of the present invention;

FIG. 1B is a simplified pictorial illustration of a device for navigation in a non-Global Positioning System (GPS) environment, in accordance with an embodiment of the present invention;

FIG. 2A is a simplified schematic illustration of another device for navigation in a non-Global Positioning System (GPS) environment, in accordance with an embodiment of the present invention;

FIG. 2B is a simplified pictorial illustration of a system for navigation in a non-Global Positioning System (GPS) environment, in accordance with an embodiment of the present invention;

FIG. 3A is a simplified schematic illustration of another device for navigation in a non-Global Positioning System (GPS) environment, in accordance with an embodiment of the present invention;

FIG. 3B is a simplified flowchart of a fragmentation algorithm for fragmenting a route, in accordance with an embodiment of the present invention;

FIG. 4A is a simplified schematic illustration of another device for navigation in a non-Global Positioning System (GPS) environment, in accordance with an embodiment of the present invention;

FIG. 4B is a simplified pictorial illustration of a system for navigation in a non-Global Positioning System (GPS) environment, in accordance with an embodiment of the present invention;

FIG. 5A is a simplified schematic illustration of another device for navigation in a non-Global Positioning System (GPS) environment, in accordance with an embodiment of the present invention;

FIG. 5B is a simplified pictorial illustration of a system for navigation in a non-Global Positioning System (GPS) environment, in accordance with an embodiment of the present invention;

FIG. 5C is a simplified pictorial illustration of another system for navigation in a non-Global Positioning System (GPS) environment, in accordance with an embodiment of the present invention;

Figure 5C:
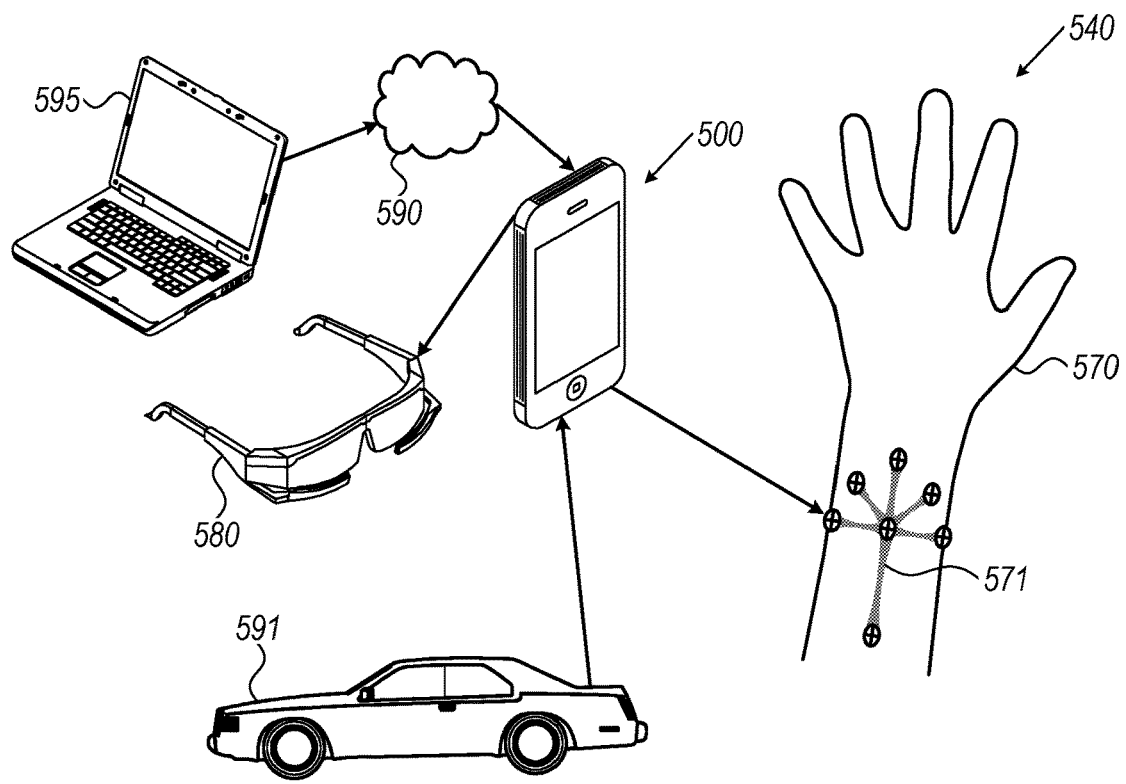
Figure 5D:
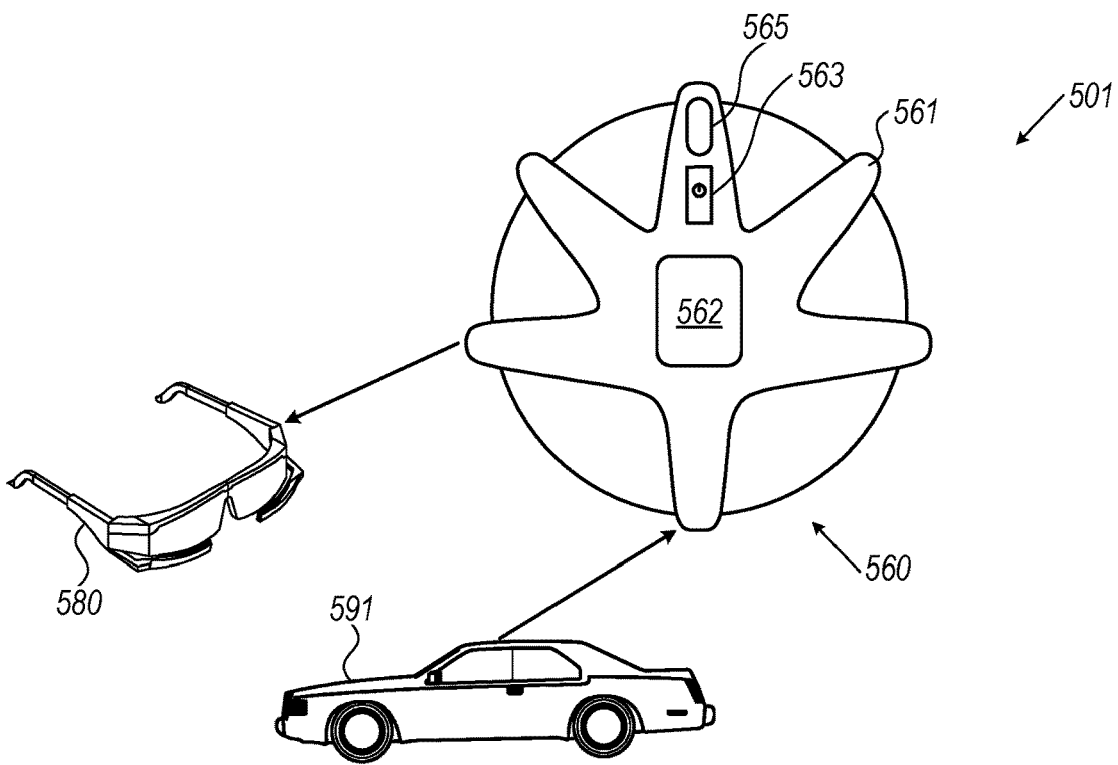
Figure 6A:
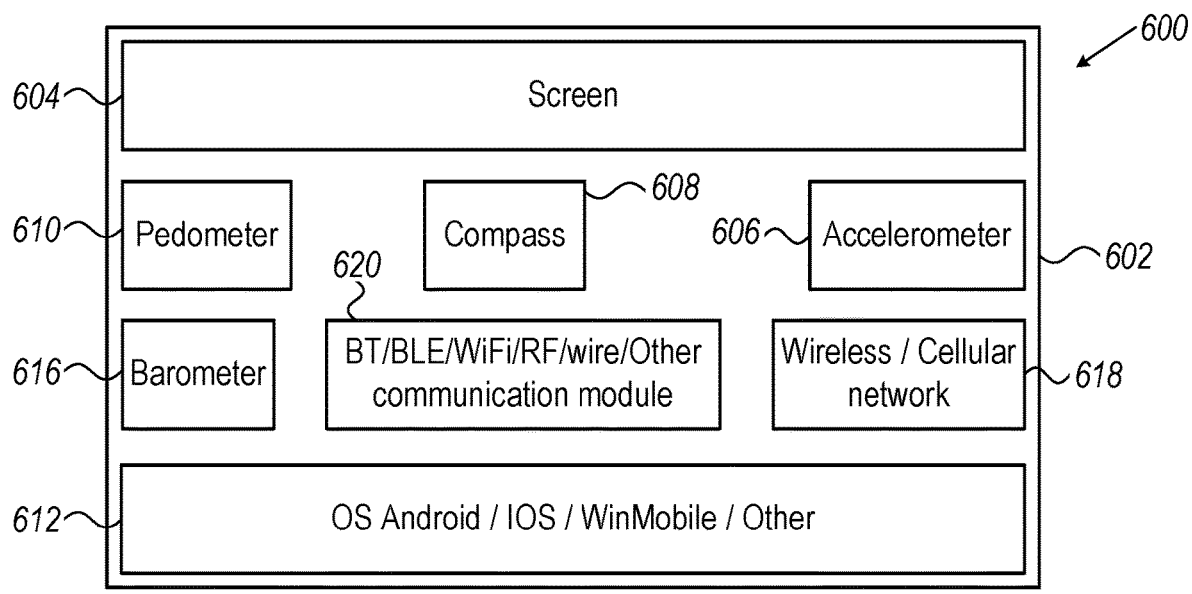
Figure 6B:
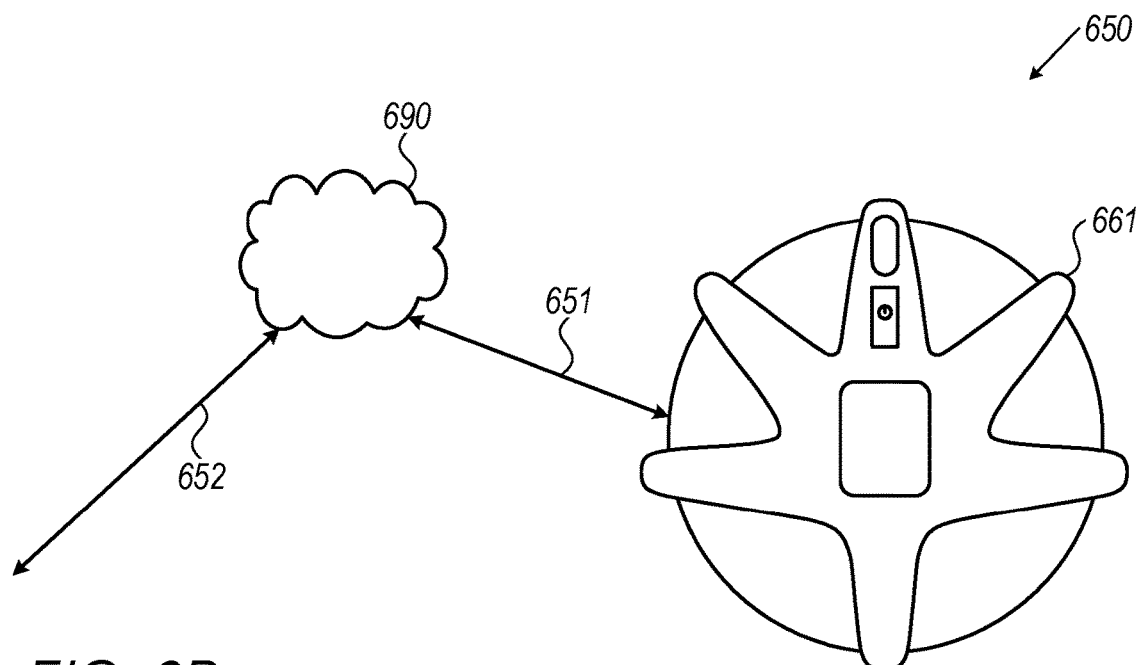
Figure 7A:
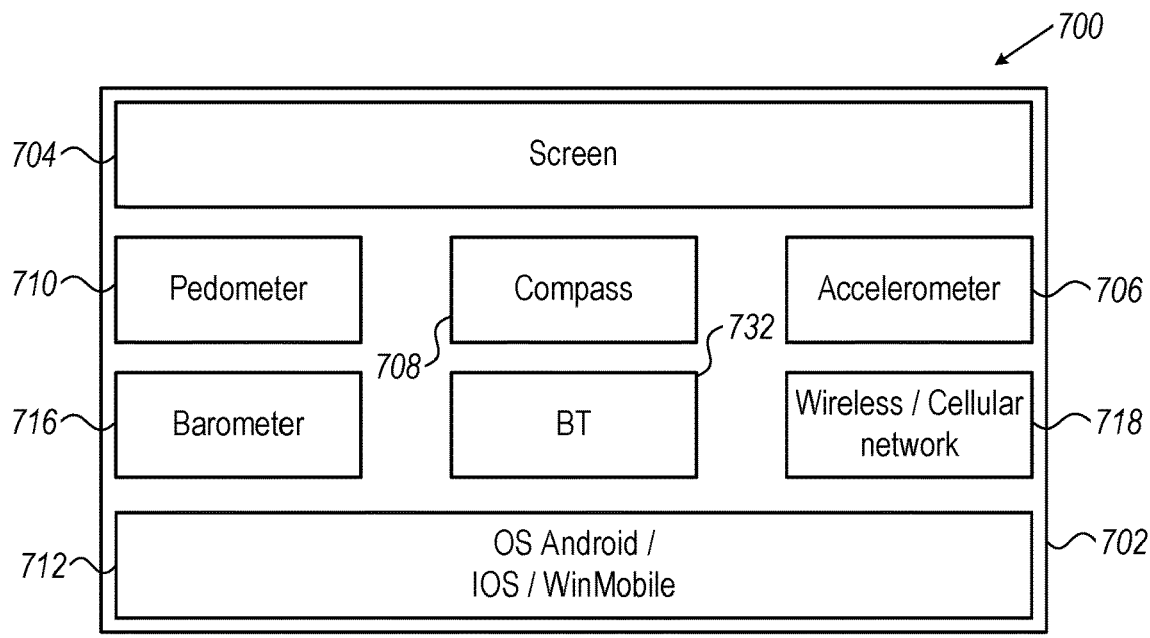
Figure 7B:
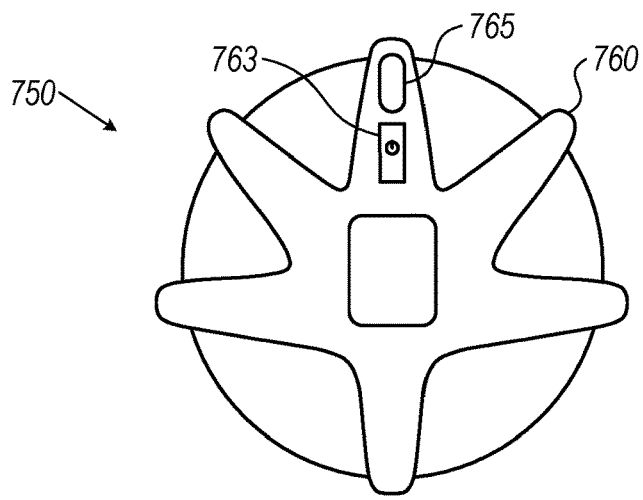
Figure 8:
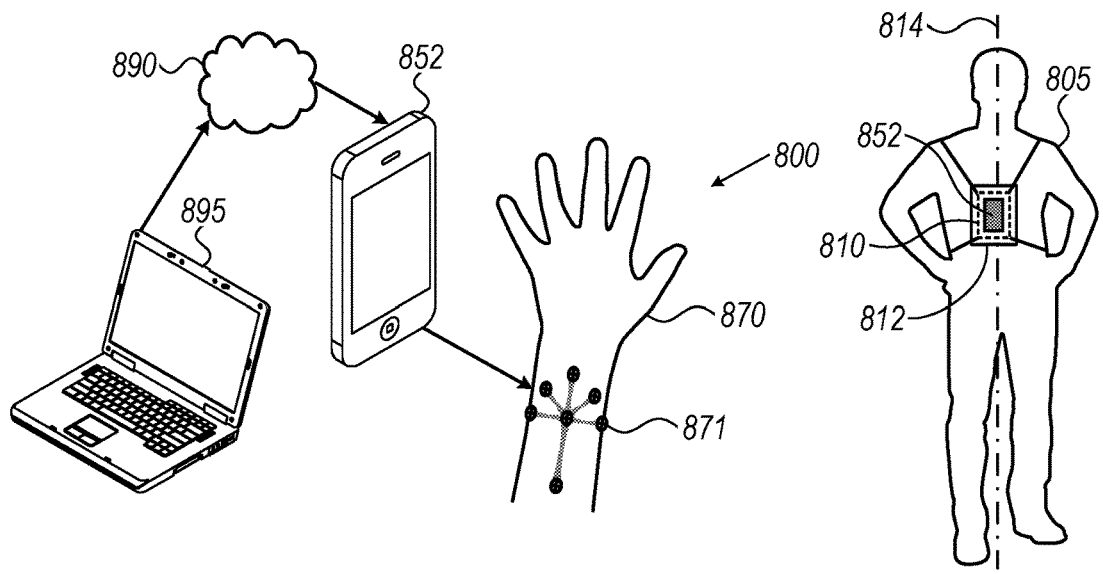
Figure 9:
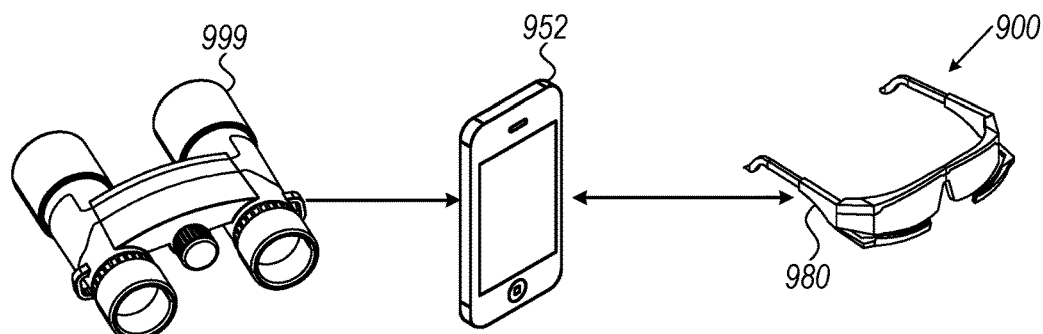
Figure 10:
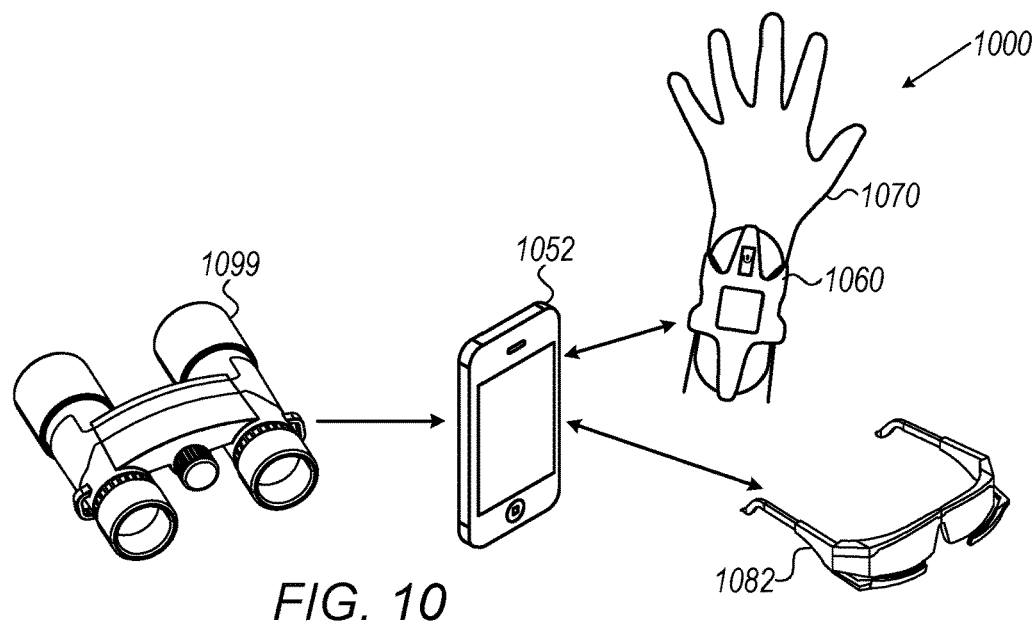
Figures 11A, 11B:
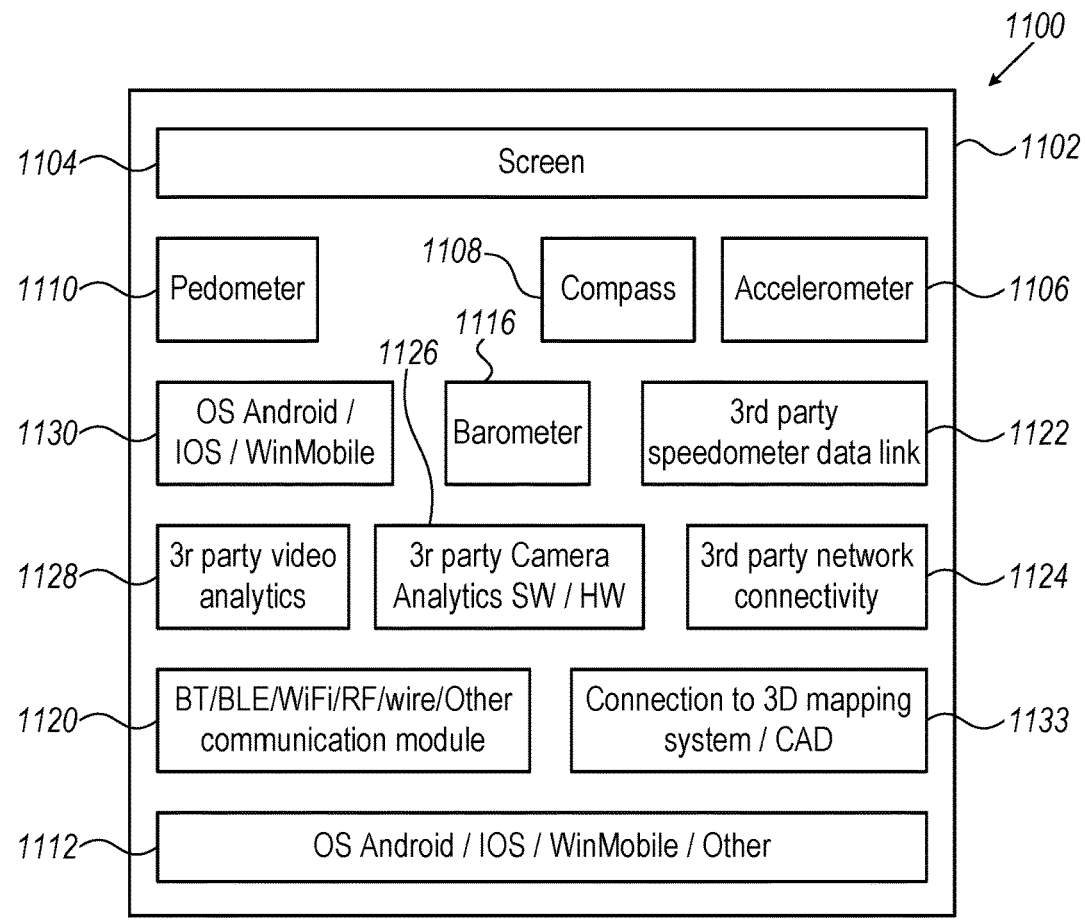
Figure 12A:
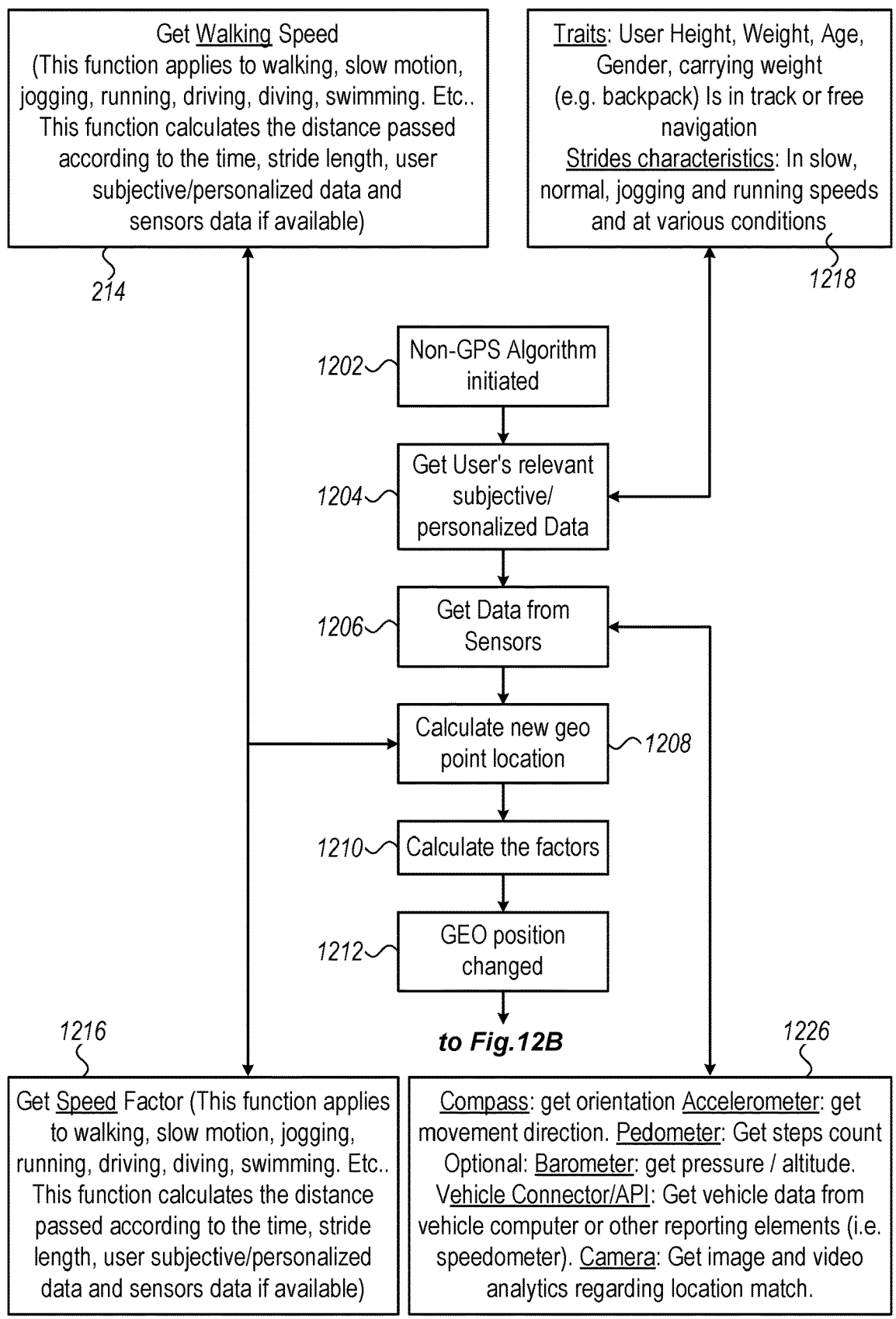
Figure 12B:
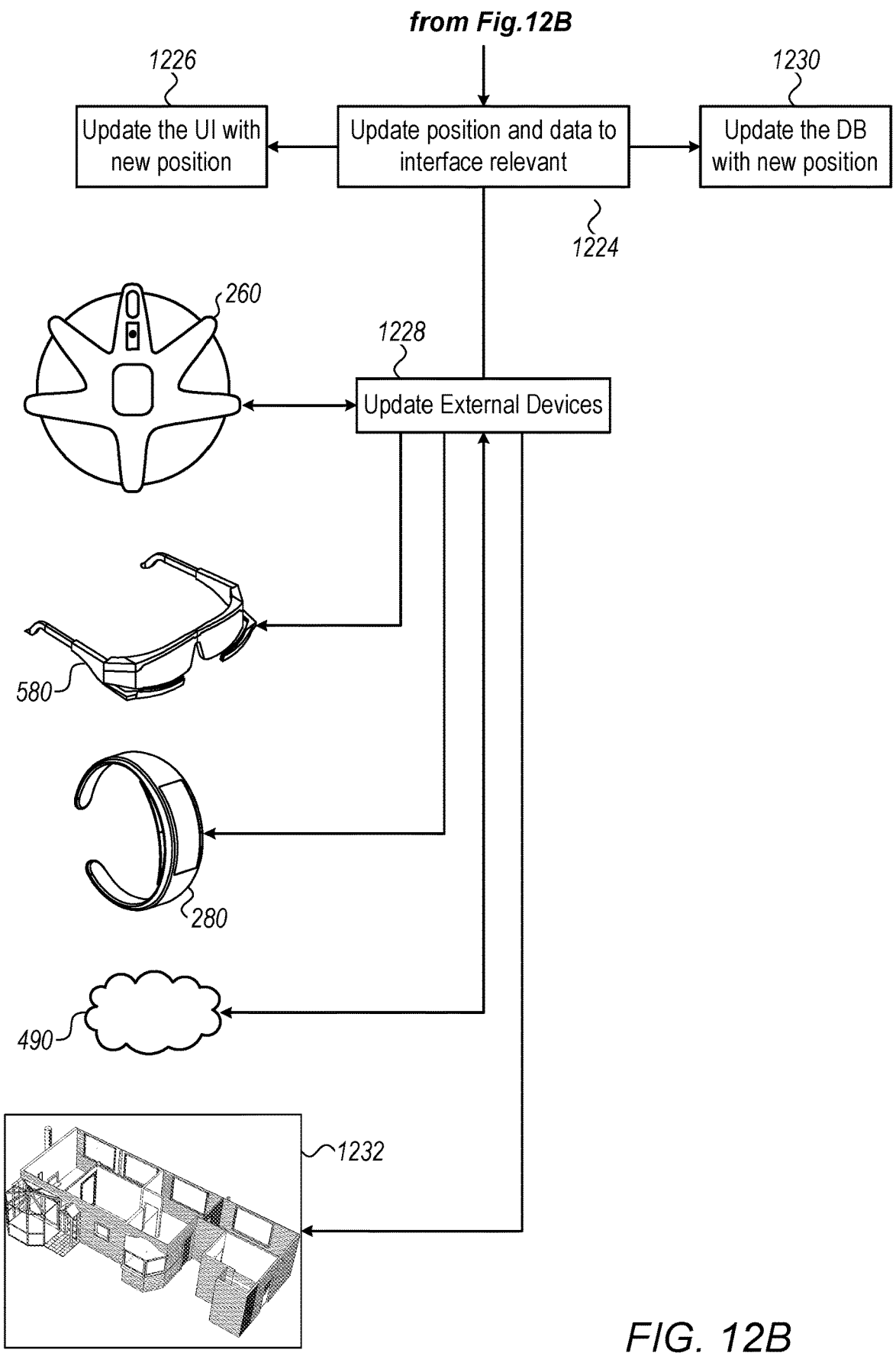
Figure 13:
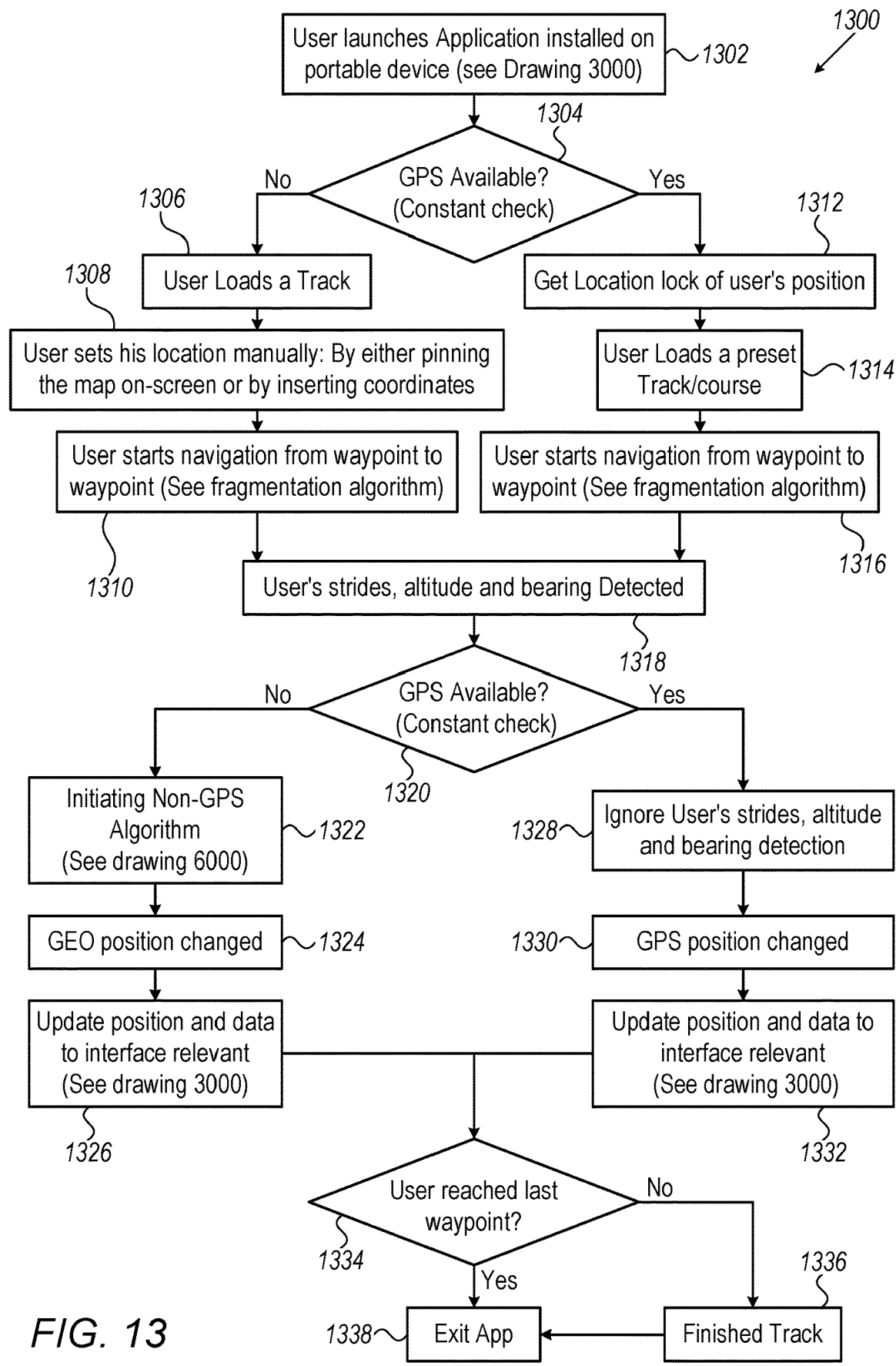
Figure 14:
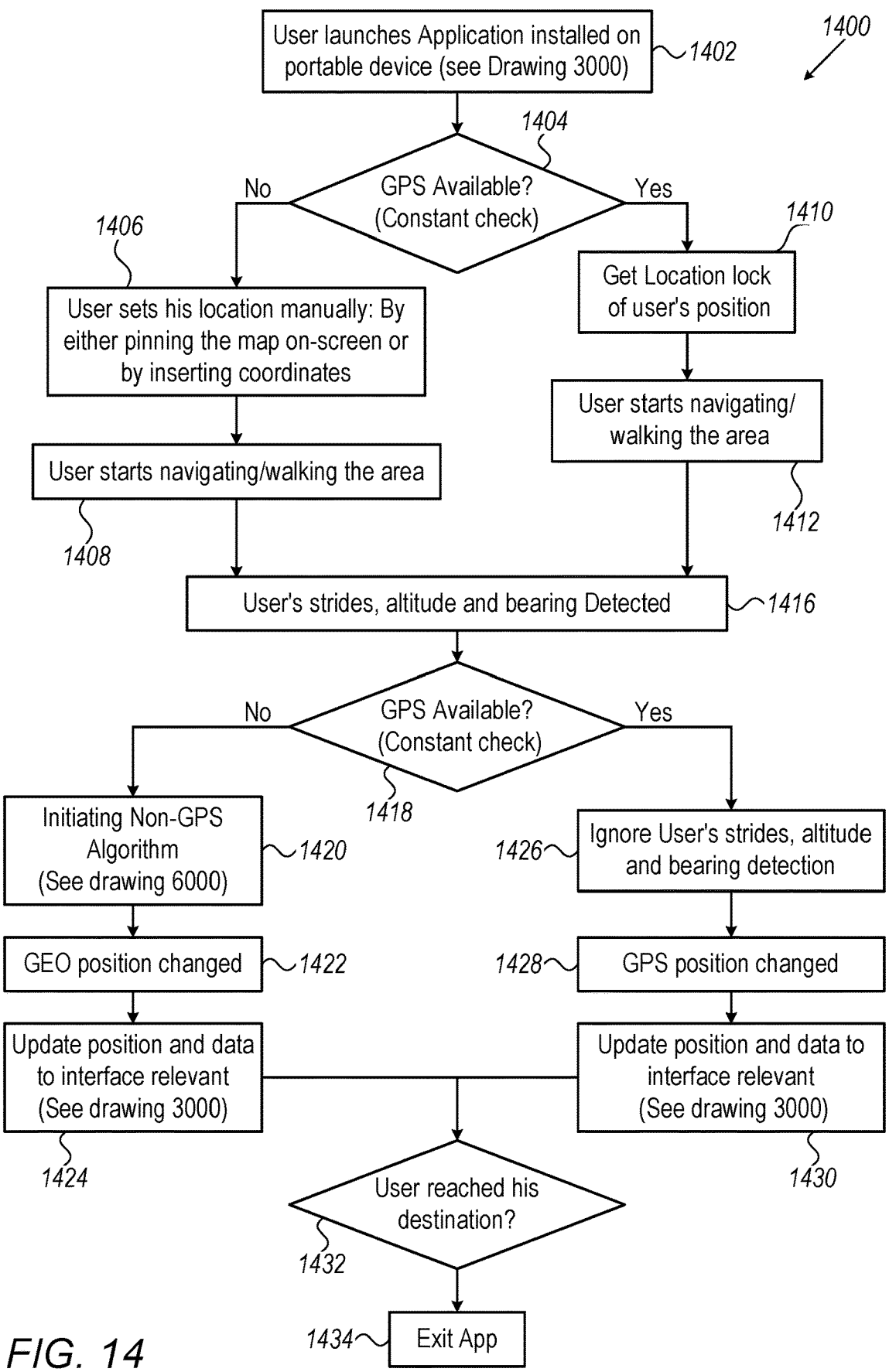
Figure 15:
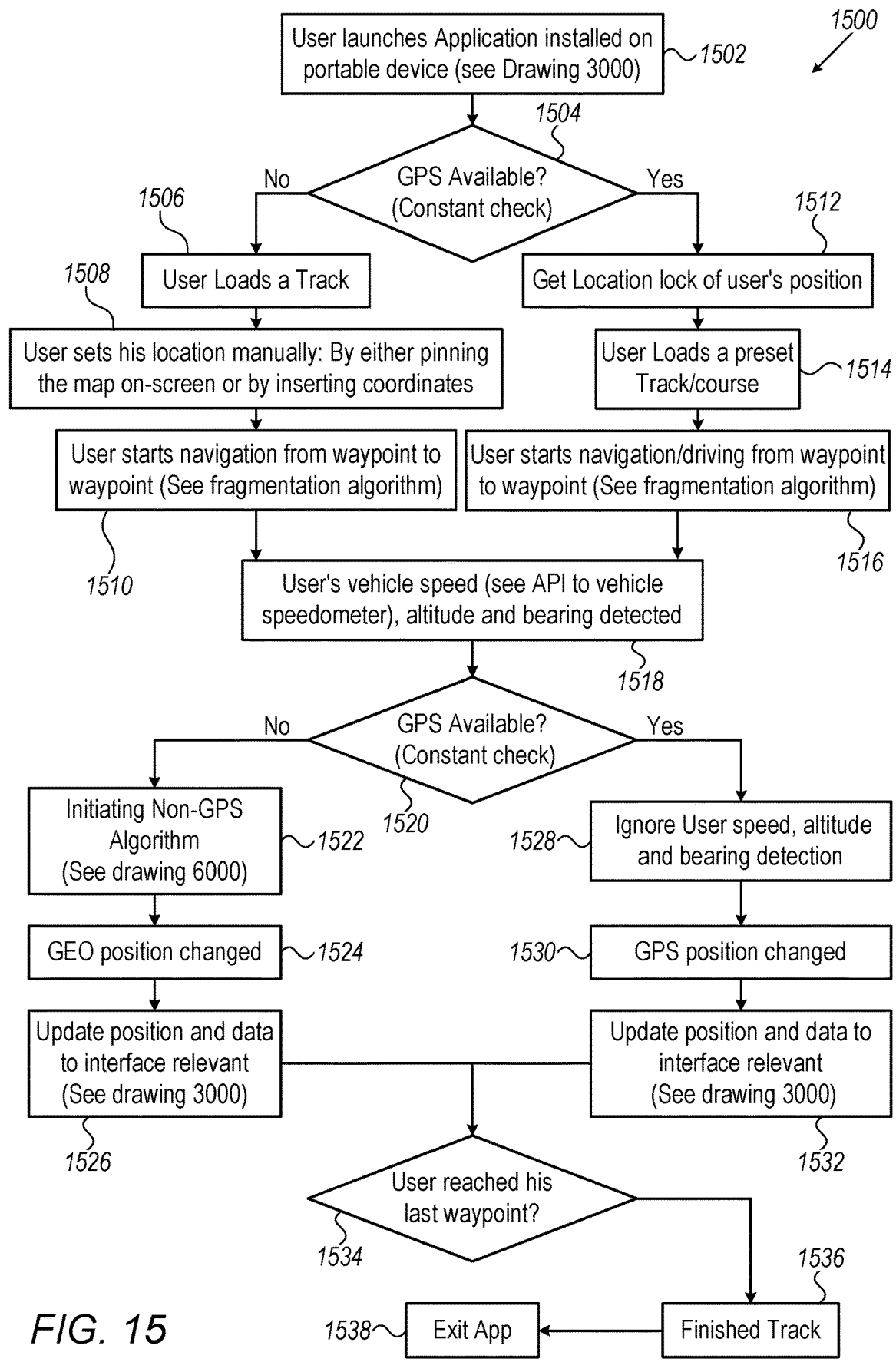
Figure 16:
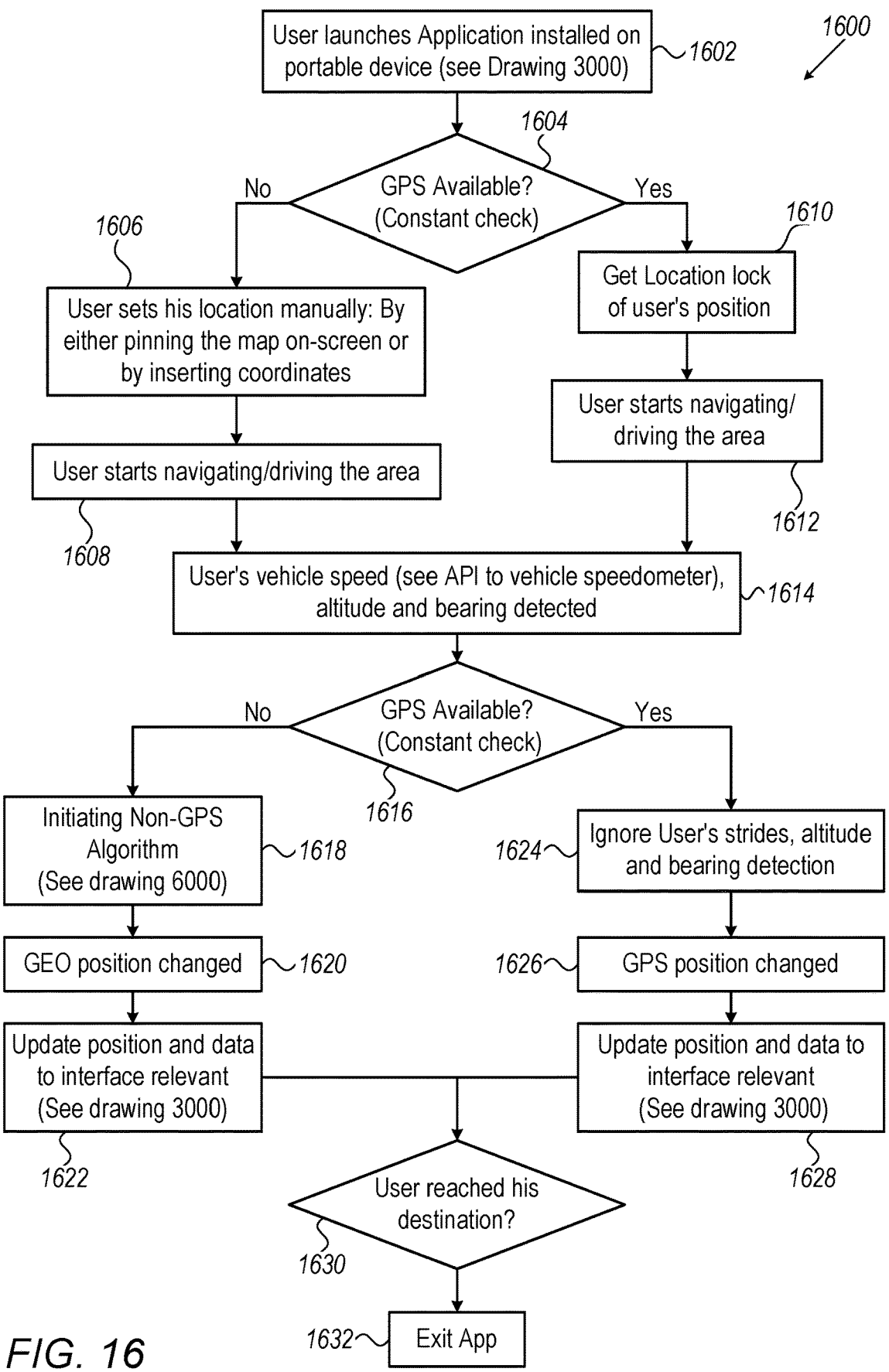
Figure 17:
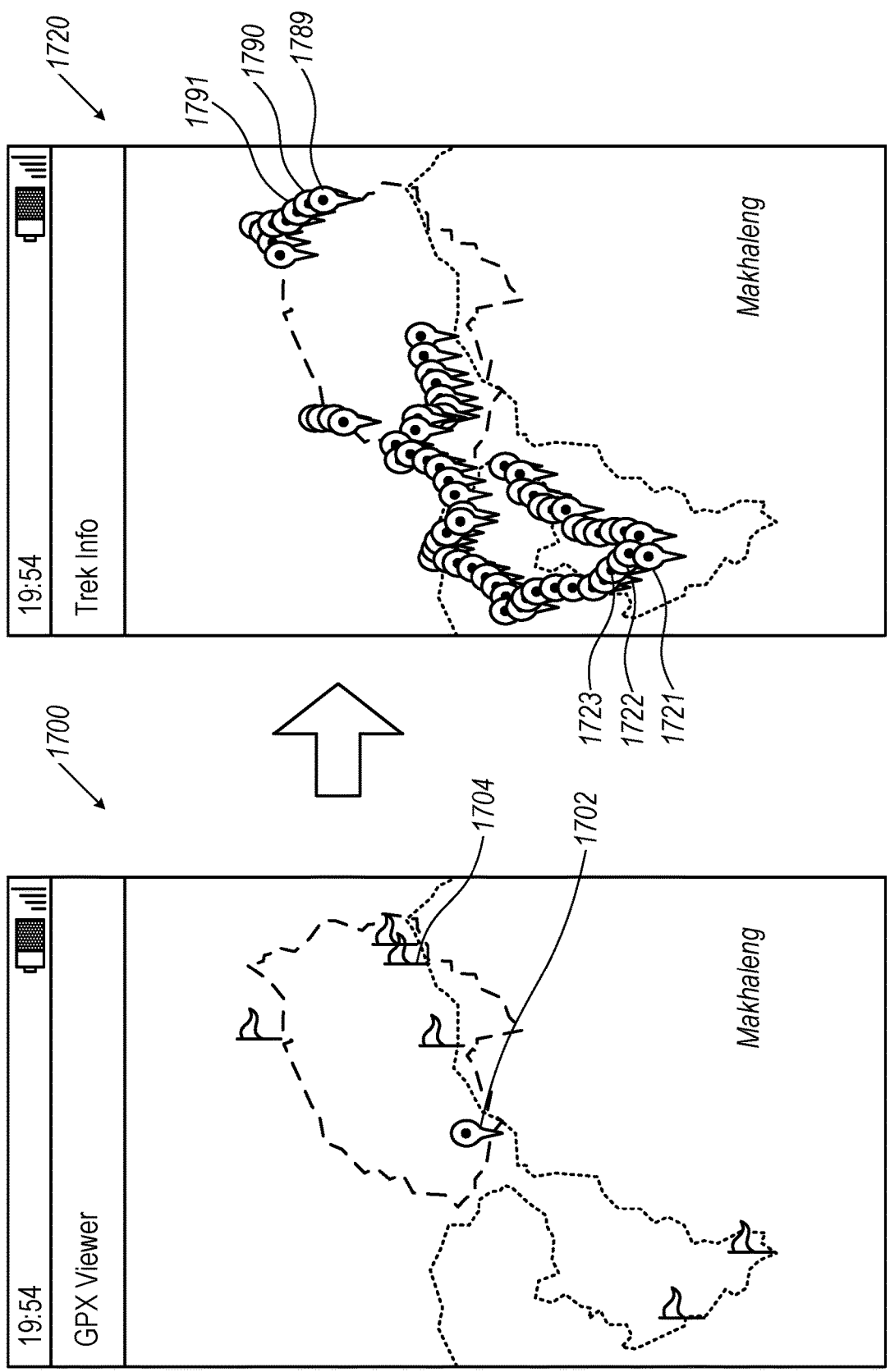
Figure 18:
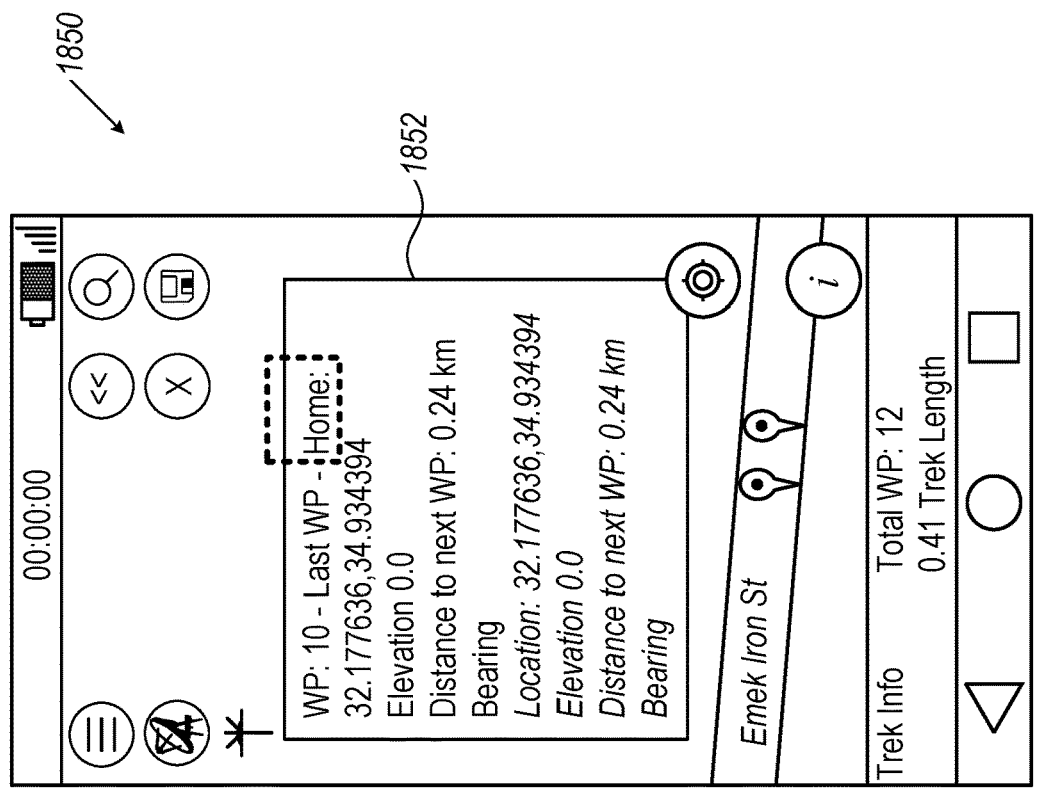
Figure 18:
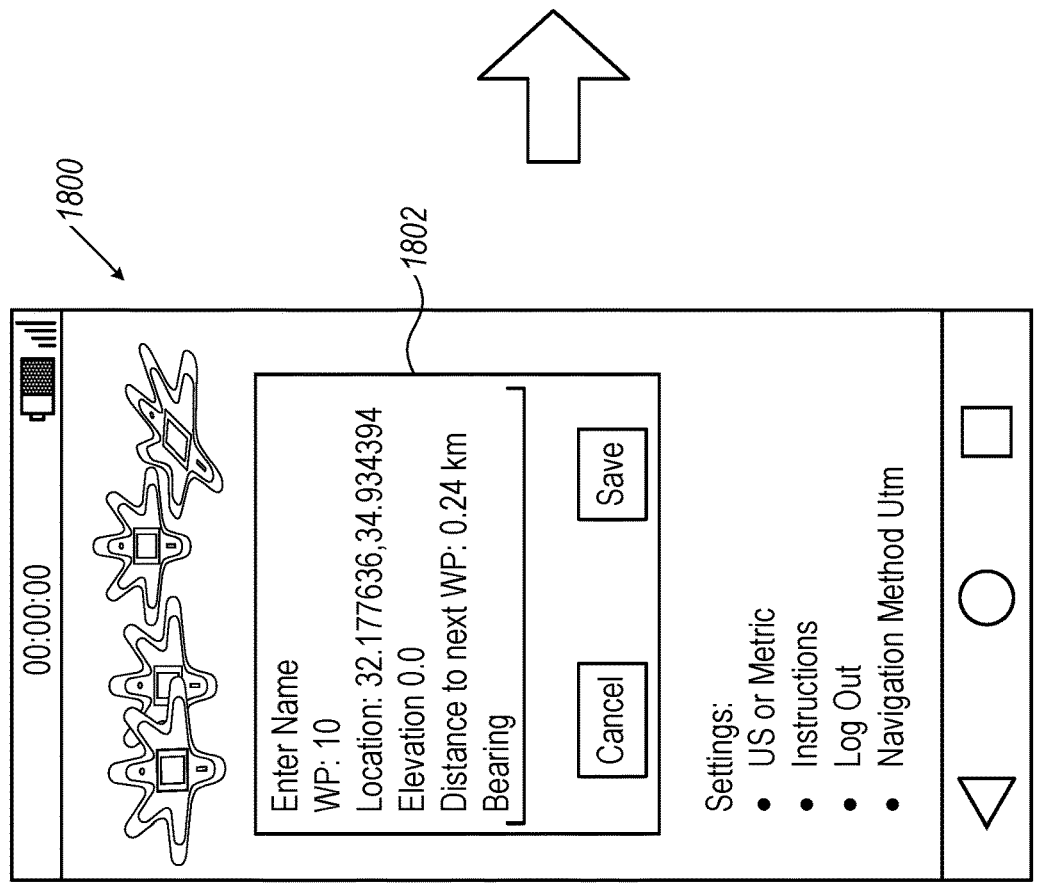
Figure 19:
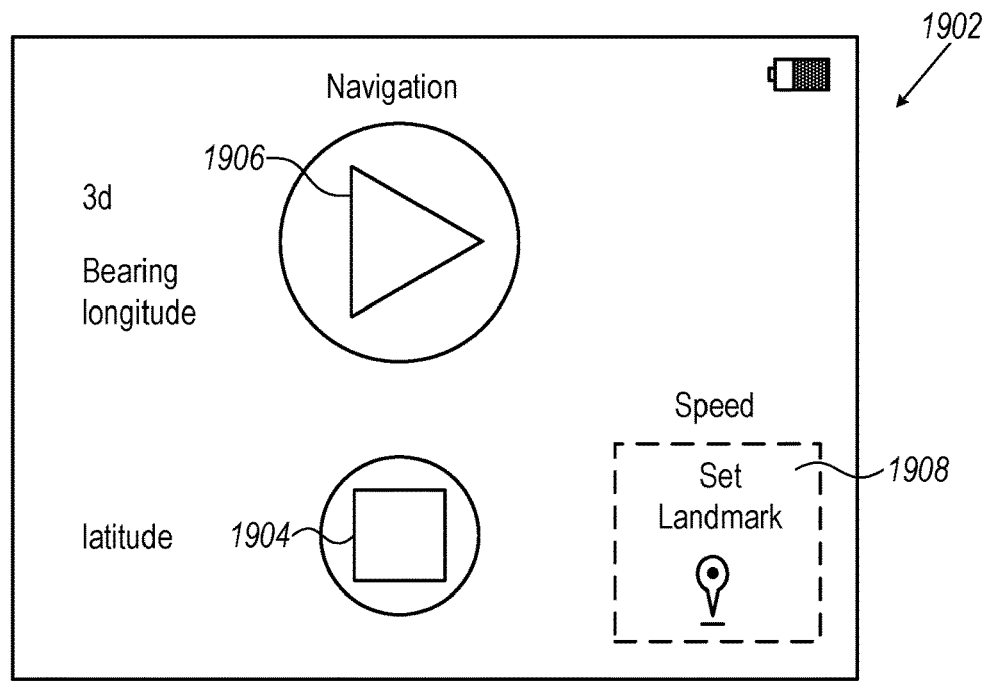
Figure 20:
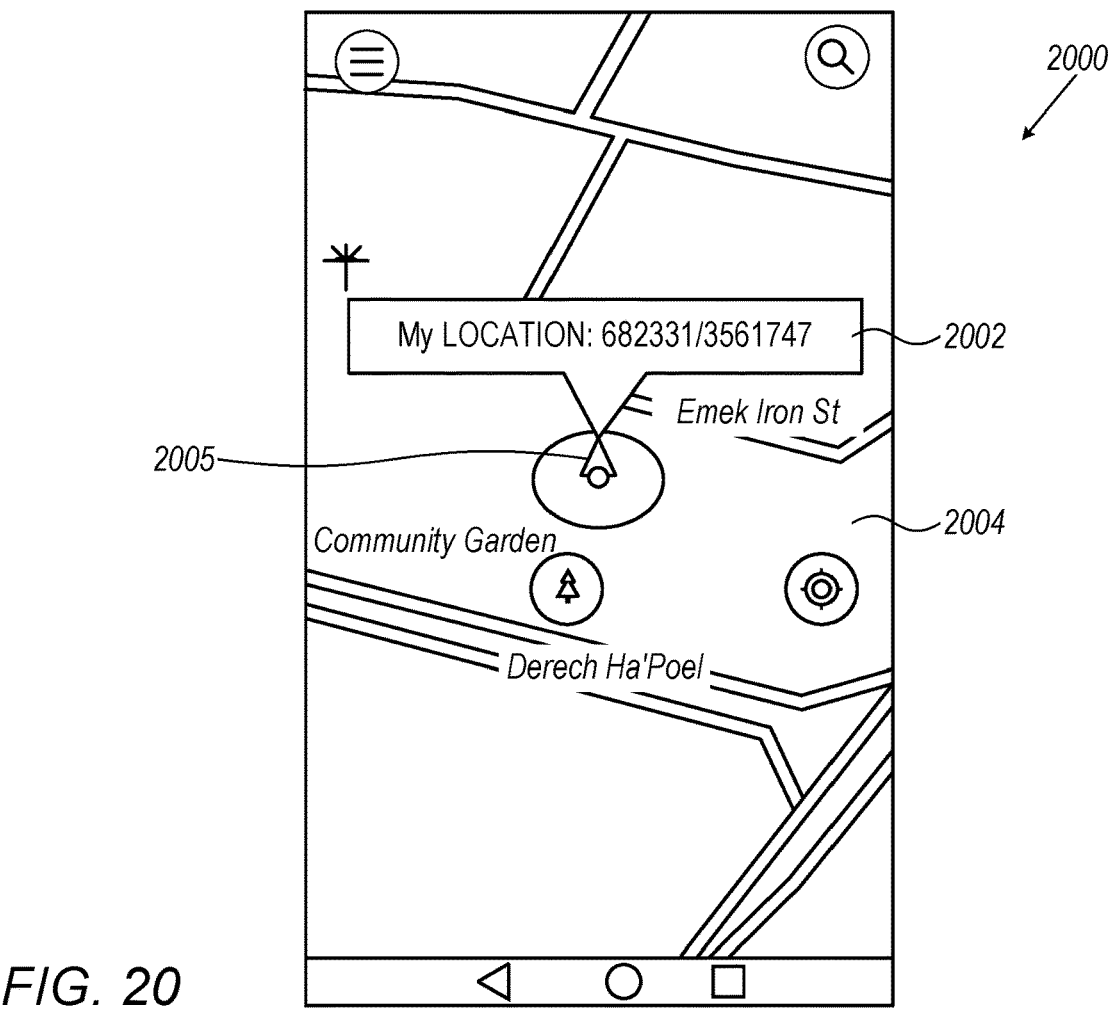
Figure 21:
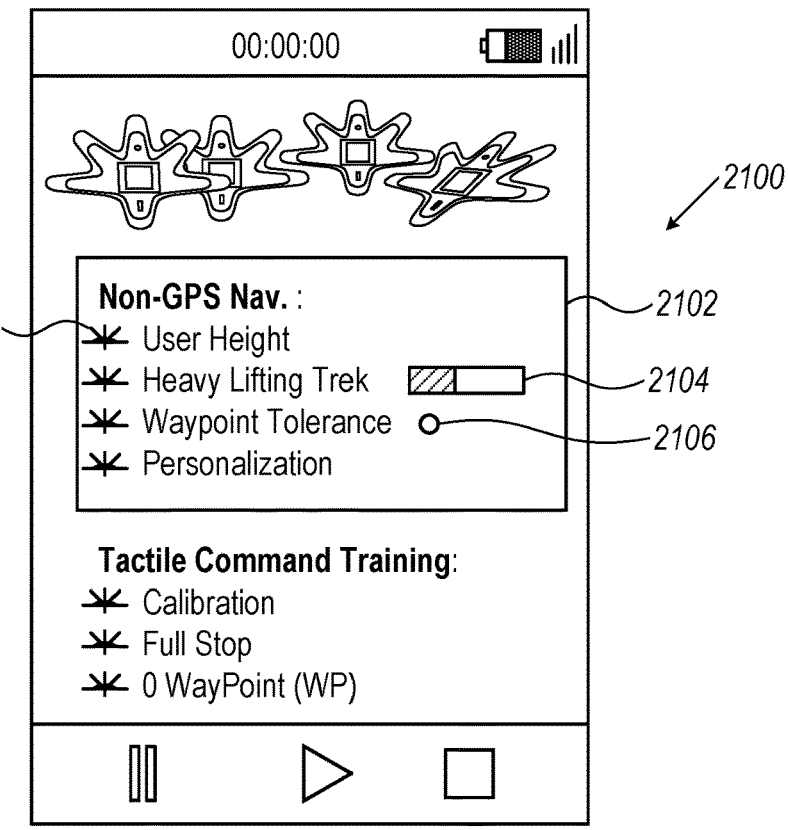
Figure 22:
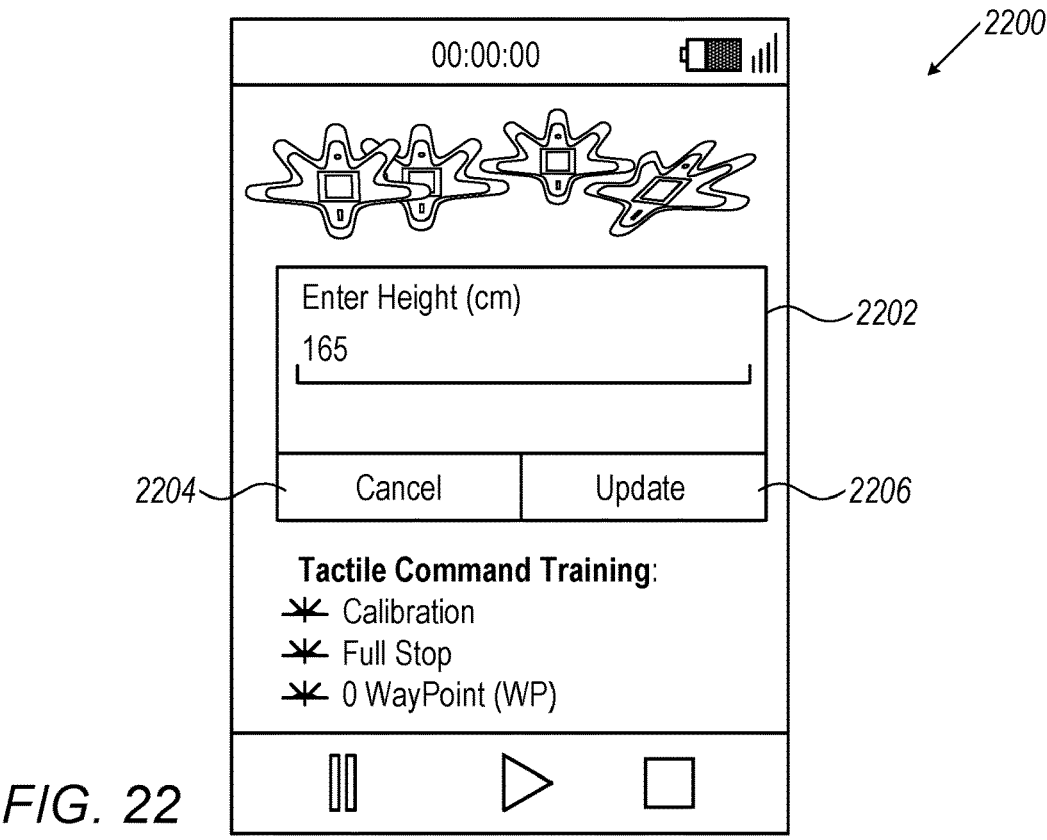
Figure 23:
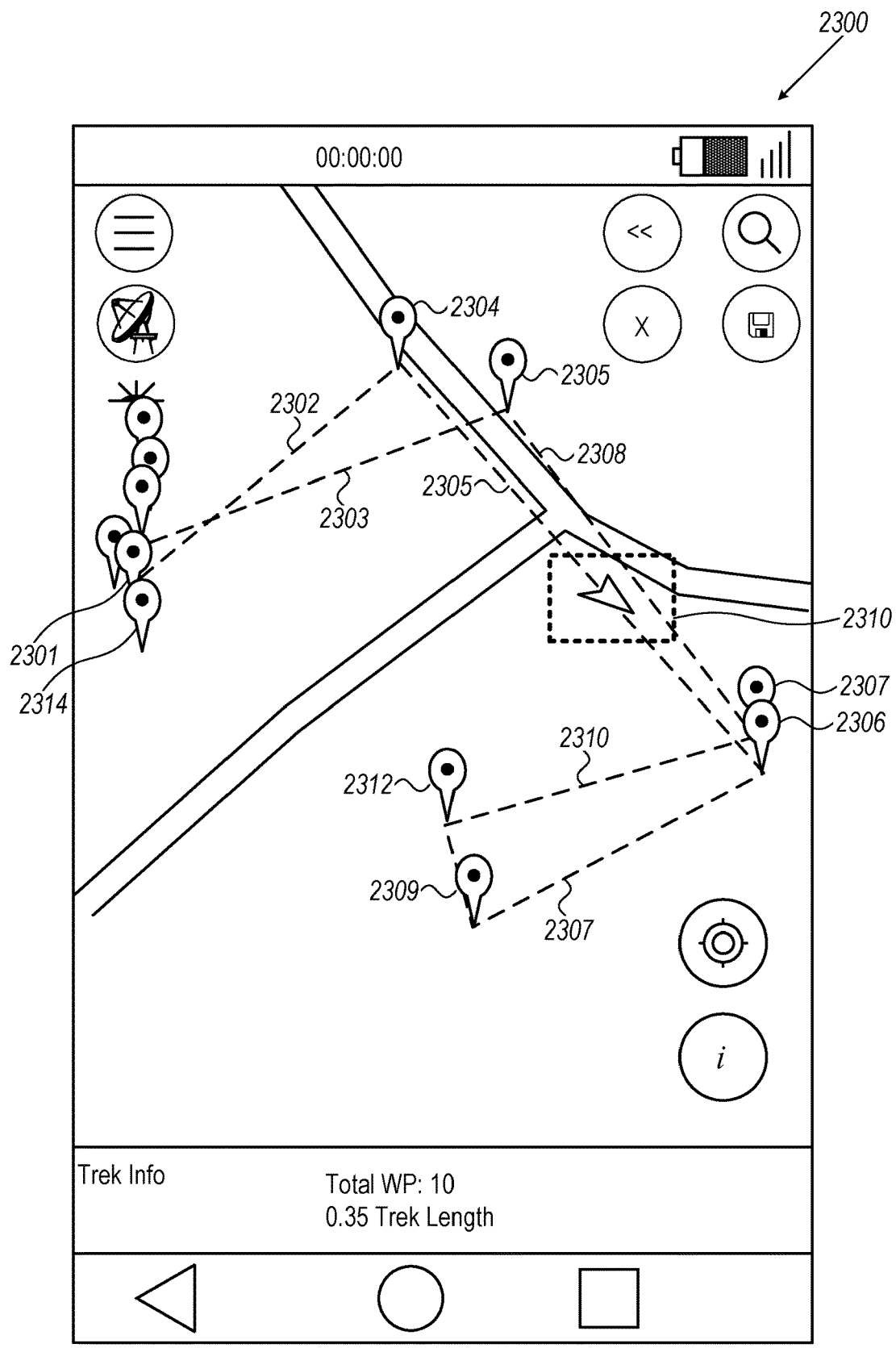
Figure 24:
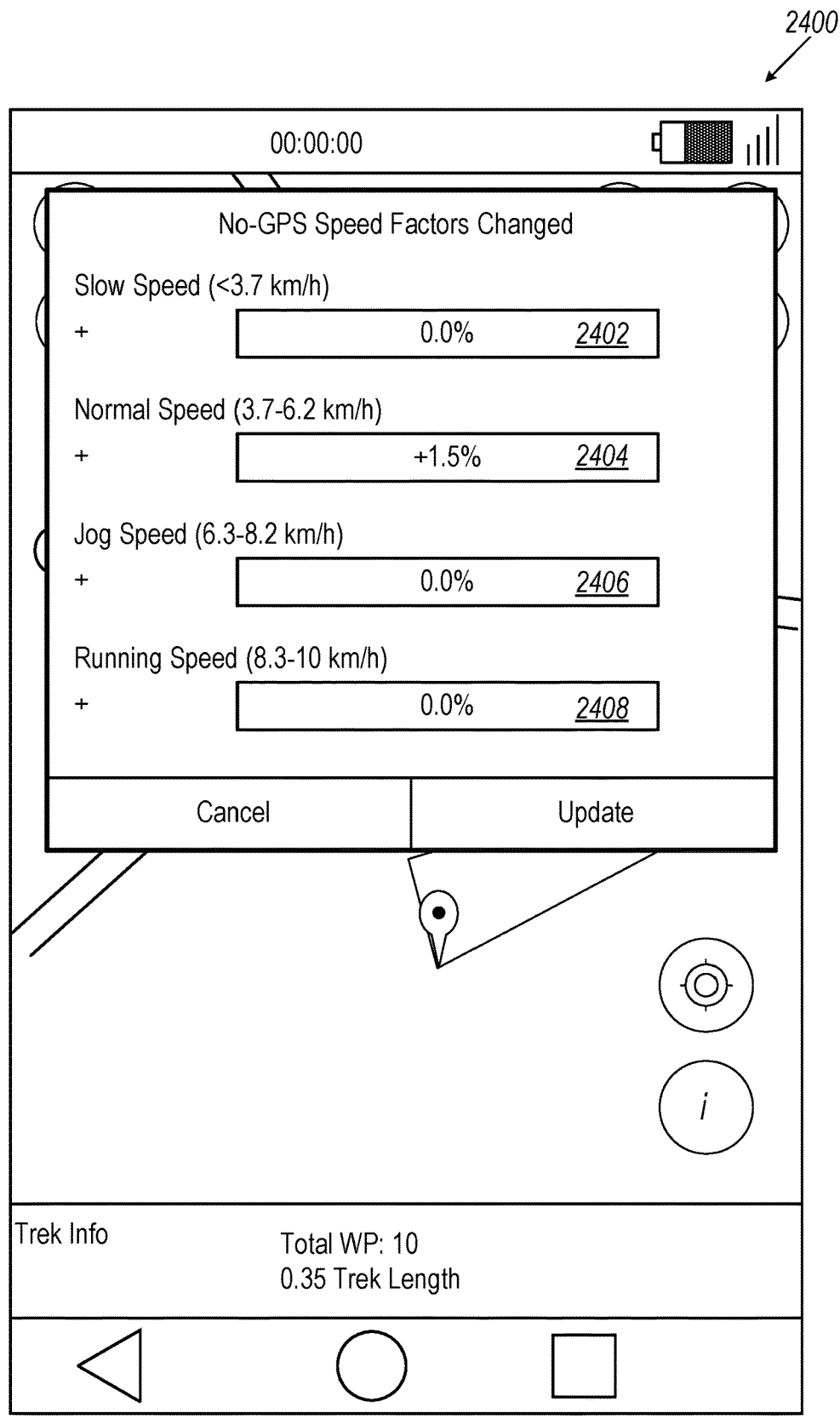

FIG. 5D is a simplified pictorial illustration of another system for navigation in a non-Global Positioning System (GPS) environment, in accordance with an embodiment of the present invention;

FIG. 6A is a simplified schematic illustration of another device for navigation in a non-Global Positioning System (GPS) environment, in accordance with an embodiment of the present invention;

FIG. 6B is a simplified pictorial illustration of a system for navigation in a non-Global Positioning System (GPS) environment, in accordance with an embodiment of the present invention;

FIG. 7A is a simplified schematic illustration of a stand-alone device for navigation in a non-Global Positioning System (GPS) environment, in accordance with an embodiment of the present invention;

FIG. 7B is a simplified schematic illustration of a stand-alone device for navigation in a non-Global Positioning System (GPS) environment, in accordance with an embodiment of the present invention;

FIG. 8 is a simplified pictorial illustration of a system for navigation in a non-Global Positioning System (GPS) environment, in accordance with an embodiment of the present invention;

FIG. 9 is a simplified pictorial illustration of a system for navigation in a non-Global Positioning System (GPS) environment, in accordance with an embodiment of the present invention;

FIG. 10 is a simplified pictorial illustration of a system for navigation in a non-Global Positioning System (GPS) environment, in accordance with an embodiment of the present invention;

FIG. 11A is a simplified schematic illustration of another device for navigation in a non-Global Positioning System (GPS) environment, in accordance with an embodiment of the present invention;

FIG. 11B is a simplified pictorial illustration of the device of FIG. 11A for use in three dimensional locations, in accordance with an embodiment of the present invention;

FIGS. 12A and 12B are simplified schematic illustrations of the algorithm of a method for navigation in a non-Global Positioning System (GPS) environment, in accordance with an embodiment of the present invention;

FIG. 13 is a simplified flowchart of a method for navigation in a preset walking route in a non-Global Positioning System (GPS) environment, in accordance with an embodiment of the present invention;

FIG. 14 is a simplified flowchart of a free roaming walking method (with no pre-set route) for navigation in a non-Global Positioning System (GPS) environment, in accordance with an embodiment of the present invention;

FIG. 15 is a simplified flowchart of a method for navigation in a preset driving route in a non-Global Positioning System (GPS) environment, in accordance with an embodiment of the present invention;

FIG. 16 is a simplified flowchart of a free roaming driving method (with no pre-set route) for navigation in a non-Global Positioning System (GPS) environment, in accordance with an embodiment of the present invention;

FIG. 17 is a simplified pictorial illustration of a route fragmentation algorithm (right-hand side), versus a prior art continuous line course (left-hand side) map, showing some features and a route from point A to B, in accordance with an embodiment of the present invention;

FIG. 18 is a simplified pictorial illustration of a waypoint naming feature, in accordance with an embodiment of the present invention;

FIG. 19 is a simplified pictorial illustration of a pinning screen ("Set Landmark"), on a tactile wearable device, which zeros a distance measurement, in accordance with an embodiment of the present invention;

FIG. 20 is a simplified pictorial illustration of a screen shot on a device presenting the exact current location of the user, in accordance with an embodiment of the present invention;

FIG. 21 is a simplified schematic illustration of a screen shot of further personalization options setting screen, in accordance with an embodiment of the present invention;

FIG. 22 is a simplified schematic illustration of a screen shot of personalized height adjustment factors, in accordance with an embodiment of the present invention;

FIG. 23 is a simplified schematic illustration of a screen shot of a user navigating on a pre-set fragmented route, in accordance with an embodiment of the present invention; and FIG. 24 is a simplified schematic illustration of a screen shot of personalized adjustment factors, in accordance with an embodiment of the present invention.

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The present invention provides methods, devices, device-applications (Apps) and systems for user navigation in GPS-denied environments, the method and device-application (App) including a fragmentation algorithm for fragmenting a route/track of the user to arrive at a target/destination, with or without GPS, the algorithm being configured to reduce deviation, errors and mistakes on the route of the user.

There are several prior art systems and methods, which try to solve the challenge of navigation at GPS-denied environments. These include ones that are software applications, installed on a computerized device, basing their orientation and navigation support on the embedded sensors and software provided by the device, such as a motion sensor, steps counter, and position/orientation sensor. The limitation with these applications is that they rely on inaccurate attributes provided by the sensors and thus provide the user with inaccurate indication of his actual location, and thus disrupt the integrity of the subjected features and options (e.g. directions, corrections, proximity alerts, etc.).

When walking and/or running, the Motion sensor is the more challenging sensor. The user's speed is based (mostly) on the users acceleration and movement, used to determine the users' supposed steps and thus the distance he presumably covered. Yet, steps/strides are hard to be measured as they frequently and continuously change due to objective and subjective factors: Harsh terrain, climbing and descending, walking sideways, etc. Are objective factors that affect the stride length. And fatigue, weight, weight carried, height, etc. are subjective factors of a given user that also effect the stride length. The inconsistency of stride length between different users and between different settings and circumstances, at which the user is walking, makes it practically impossible to accurately measure the strides length and thus the distance the users walked. Moreover, different tempos affect the length of the strides. Walking and running result different strides' length, and slow, smooth, steps are frequently not noticed by the sensor and growing differences between the actual distance and the one indicated by these applications is growing exponentially as the planned route (course, trek, track) is longer ("longer route equals bigger difference/mistakes").

These effecting factors are creating growing differences between the actual distance the user covered and the one indicated by these applications. The difference is growing exponentially as the planned route (course, trek, track) is longer as the user walks more hard-to-measure strides on a longer route. ("longer route equals bigger difference/mistakes"). Thus, without knowing the actual distance the user traveled, these apps cannot determine the actual location of the user, cannot determine his actual position towards his destination, and thus are unpractical for navigation.

In addition, these available prior art software applications lay, set and drew their navigation routes (the course from A to B) as a continuous line (by the user or automatically generated).

This continuous line-trail is actually an assimilation of hundreds or thousands of waypoints, very close to each other. The proximity of each waypoint to next enables, in one hand, to create curved round routes (following an actual road), but at the same time makes it harder and even impossible to follow the azimuth (bearing) between waypoints (as there are so many of them with very wide angels), and thus to provide the user with clear heading instructions, such as "turn 22.5 degrees left", "turn degrees to the right".

This limitation creates frequent deviation from the true bearing and actual route especially at open, unpaved, unmarked areas where the trail is not clear.

The combination of these two limitations; (a) deviation from true bearing and (b) deviation from actual distance, restrict software applications, installed on a computerized device, basing their orientation and navigation support on the embedded sensors and software provided by the device, to the extent that they are not practical at GPS-denied environments.

According to some embodiments, the present invention employs a wearable navigation forearm-band device, described in International Patent Publication WO2016/113, 730, to Gabbay, incorporated herein in its entirety, by reference.

Reference is now made to FIG. 1A, which is a simplified schematic illustration of a device 100 for navigation in a non-Global Positioning System (GPS) environment, in accordance with an embodiment of the present invention.

The device comprises various components or sensors, such as, but not limited to, a casing 102, a screen or display 104, an accelerometer 106, a compass 108, a pedometer 110 and Operating System Software 112, such as, but not limited to OS Android/IOS/Winmobile or other.

The device is typically light and portable, and is constructed to operate at least one navigation App, using and/or activating one or more of the components or sensors described herein. In some cases, the device is a cellphone. Device 100 (FIG. 1A) is suitable for use in the system of FIG. 1B.

FIG. 1B is a simplified pictorial illustration of a device 150 for navigation in a non-Global Positioning System (GPS) environment, in accordance with an embodiment of the present invention. The device may be a cellphone comprising a casing 152 and screen 154. In some cases the device is constructed to work without external communication or a communication network, but yet to enable the navigation App to function.

Reference is now made to FIG. 2A, which is a simplified schematic illustration of another device 200 for navigation in a non-Global Positioning System (GPS) environment, in accordance with an embodiment of the present invention.

The device comprises various components, such as, but not limited to, a casing 202, a screen or display 204, an accelerometer 206, a compass 208, a pedometer 210 and Operating System Software means 212, such as, but not limited to OS Android/IOS/Winmobile or other. Communication modules (E.g. BT/BLE/WiFi, RF/Wire) 214.

Figure 2B:
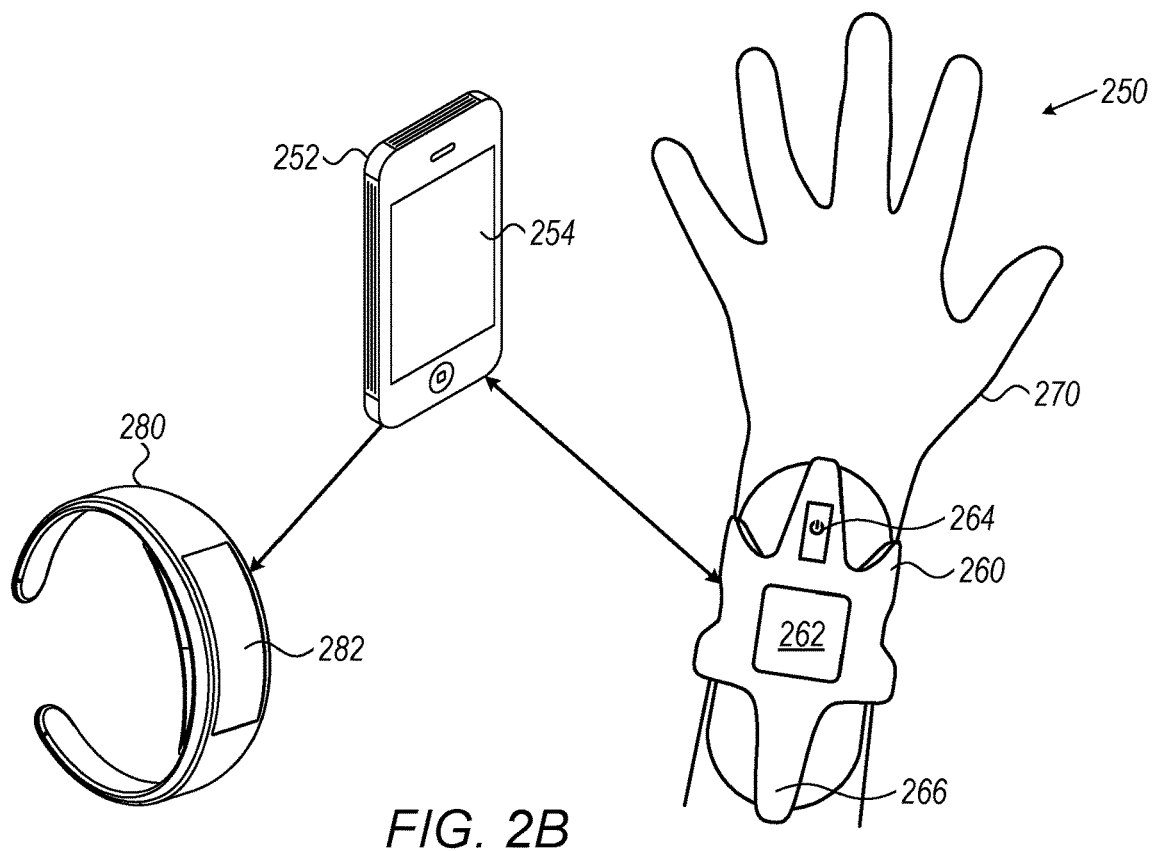

FIG. 2B shows portable device 200, adapted to operate an App to connect to another interface device 260, such as a forearm band device 260, on an arm 270, or a smart watch 260 with a display 282.

Device 260 is also termed herein a "forearm-band sensation device". It is specifically designed and developed to deal with the extreme circumstances and conditions the user is experiencing at sport, extreme and military navigation scenarios and conditions.

The forearm-band sensation device is specifically designed and developed to enable intuitive navigation by the user despite the extreme circumstances and conditions the user is experiencing at sport, extreme and military navigation scenarios and conditions.

The forearm-band sensation device is specifically designed and developed to enable intuitive navigation by the user while overwhelmed by stimulations from all senses all over the body, such as noises, rain, beatings, wounds, cold, heat and the like and by high-adrenaline sensations and emotions such as fear, pain and aggressiveness.

The invented forearm-band sensation device is specifically designed and developed to separate, distinguish and differentiate between the sensations (vibration and/or flicker or other tactile stimuli as detailed hereinabove) and thus enabling the user to easily comprehend the directions and thus to intuitively navigate at sport, extreme and military scenarios and conditions. Devices 200, 260 (FIG. 2A) are suitable for use in the system of FIG. 2B.

Reference is now made to FIG. 2B, which is a simplified pictorial illustration of a system 250 for navigation in a non-Global Positioning System (GPS) environment, in accordance with an embodiment of the present invention. Device 260 is adapted for placing on a forearm of a user. When the user is human, the devices dimensions are typically 10-40 cm in length, 5-20 cm in width, and has a thickness of 0.1-80 mm. The device may be made, in part out of a flexible polymer, such as rubber, silicone, plastic, a textile, a fabric and combinations thereof. When the device is for an animal, the dimensions are adjusted to match a body or leg of the animal Device 260 comprises a plurality of micro-vibrators 268 (not shown). Additionally or alternatively these may be providers of other tactile stimuli, as exemplified herein. Most or all of the micro-vibrators are disposed on the tip of "arms" 266. These may optionally extend radially from a central display 262, and an on/off switch 264. The arms are made, in part out of a flexible polymer, such as rubber, silicone, plastic, a textile, a fabric and combinations thereof.

The device is typically light and portable, and is constructed to operate at least one cell phone navigation App, using one or more of the components described hereinabove. In some cases, device 252 is a cellphone with a display 254. Device 252 is configured to activate and run an App connected to the armband device and/or smart watch 280 and/or to other similar devices (e.g. HUD), not shown for the sake of simplicity.

In some cases, cellphone device 200, 252 comprises a BT/BLE/WiFi/RF/wire/other communication module 214.

Figure 3A:
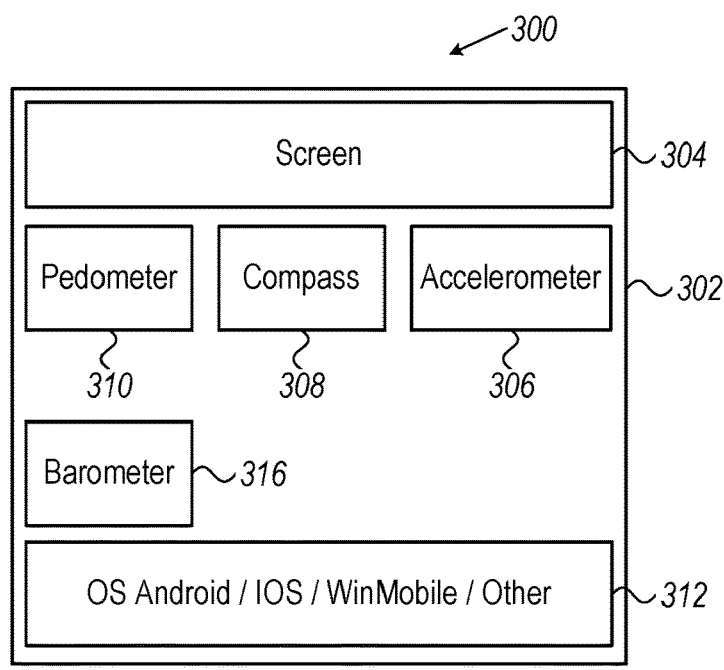

Reference is now made to FIG. 3A, which is a simplified schematic illustration of another device 300 for navigation in a non-Global Positioning System (GPS) environment, which allows the device to operate an App using a barometer 316 to enable 3-dimensional (3D) navigation. Device 300 typically comprises a casing 302, a screen or display 304, an accelerometer 306, a compass 308, a pedometer 310 and communications means 312, such as, but not limited to OS Android/IOS/Winmobile or other.

Figure 4A:
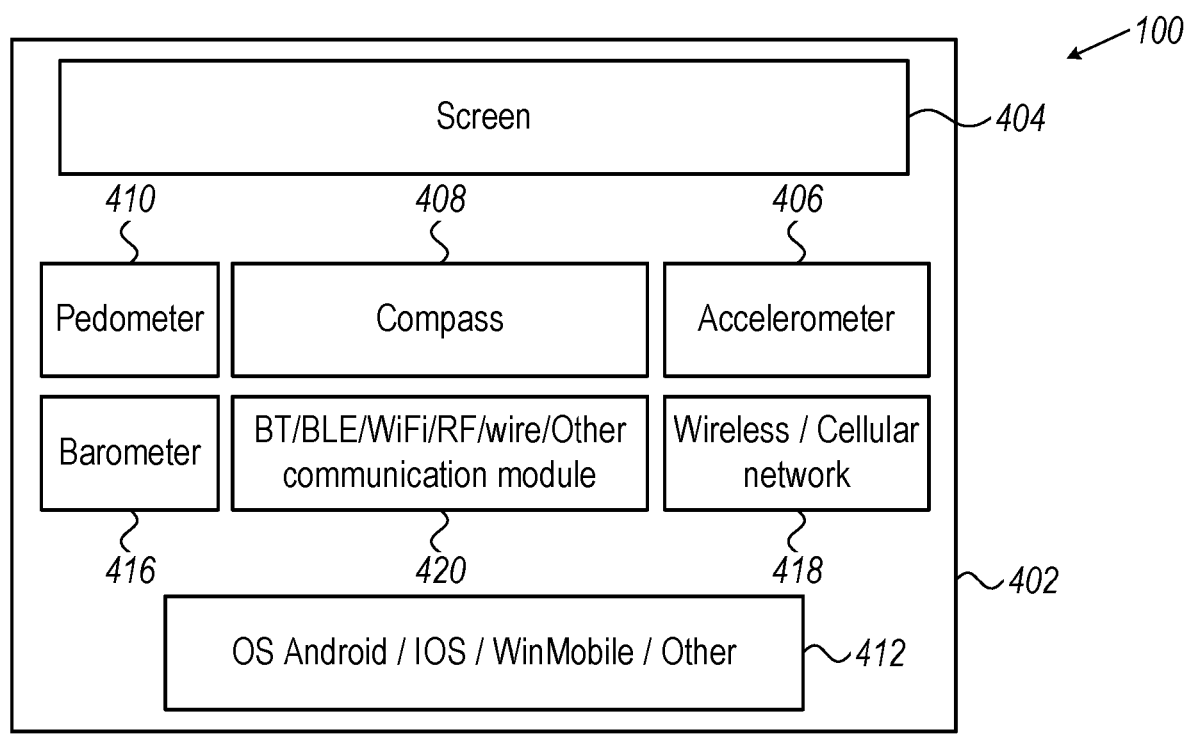

Turning to FIG. 4A, there is seen a simplified schematic illustration of another device 400 for navigation in a non-Global Positioning System (GPS) environment, in accordance with an embodiment of the present invention. The device comprises various components, such as, but not limited to, a casing 402, a screen or display 404, an accelerometer 406, a compass 408, a pedometer 410 and Operating System Software 412, such as, but not limited to OS Android/IOS/Winmobile or other. Device 400 is configured with a BT/BLE/WiFi/RF/wire/other communication module 414, a barometer 416, a wireless/cellular network component 418, to provide full app functionality and to enable $3^{rd}$ party access to a network and Bluetooth.

Figure 3B:
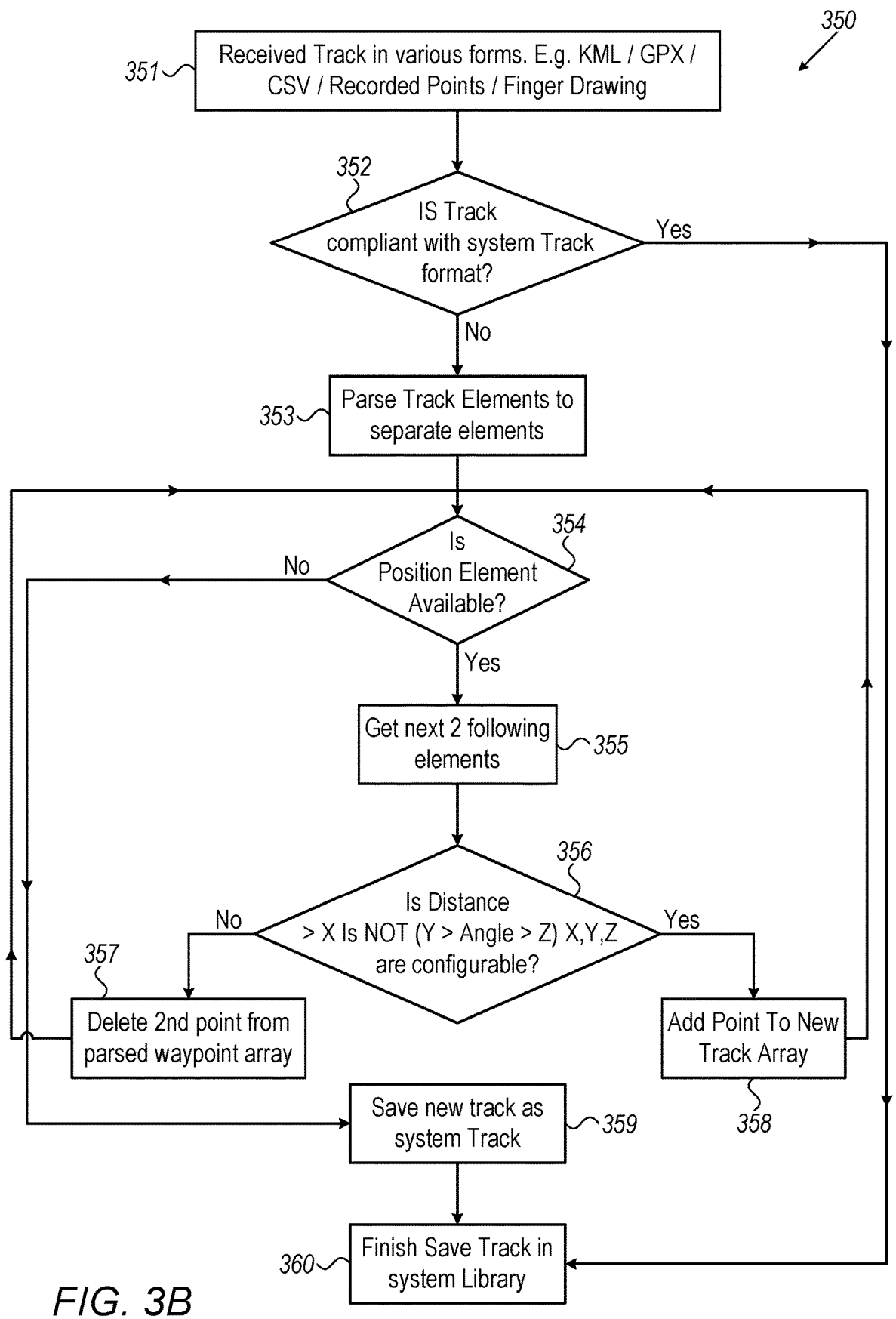

Reference is now made to FIG. 3B, which is a simplified flowchart of a fragmentation algorithm 350 for fragmenting a route, in accordance with an embodiment of the present invention.

This flowchart describes the algorithm and process of parsing a track created by 3rd party navigation or GIS software or by free drawing and free navigation recording of a track in the current invention, which require fragmentation in order to provide a user with real-time bearing directions and instructions.

In a receiving information step 351, the device receives tracks from different sources and supports all standard file types and formats (e.g. GPX) received in different file types of action: received by email; downloaded from website, recorded during free-roaming navigation (FIGS. 14 and 16) or by other means.

In a checking step 352, the application checks to see if the track's file format is compatible to system's/invention's format. The algorithm is operative to check "is a current track compliant with anticipated algorithm-provided track format?? Once loaded in algorithm application, the application is operative to identify the point location, the file type and expected structures in the environment of the point location.

In a parsing track elements step 353, the application file parser is operative to break down each of the received tracks into smaller elements such as, but not limited to:

a) Layers,
b) Texts,
c) Waypoints,
d) Data,
e) Images, and
f) Drawings.

In another checking step 354, the App is operative to check if a position element is available; meaning that two waypoints at least are available. If yes, the parser runs in a loop that performs the following:

In an obtaining next two waypoints elements step 355, the next 2 elements are obtained.

In a checking step 356, the distance, and bearing between the two elements are checked for compliance with the algorithm requirements. The distance should be greater than X, and bearing is not between Y to Z angles. The parameters are configurable and the following are checked.
1. Is element A distance to element B is smaller than X (X is pre-defined in track settings)?
2. Is Element A Angle to B is greater than Y and smaller than Z (Z, Y pre-defined in track settings)?

If both 1 and 2 above provide a "yes" response, then in a deleting step 357, the 2nd element is deleted and ignored and the loop goes back now to checking step 354. Then elements A and C are used henceforth. If A and C pass the checking step 354, then the loop will return and now elements C&D are selected in an obtaining next two elements step 355.

Once no more elements available the parser will output the new file in a system structure.

The App is operative to record a track. When a user moves a finger on an onscreen map, the App is operative to saves all the waypoints, which the user has passed on the map (this comprises a large number of points) each point is treated as a waypoint.

Returning to checking step 354, if no position element is available, the user saves a new track in a saving track step 359.

Once the user hits the save button, the saved array is transferred to the track parser and undergoes the same process as a track received from an external source, until the track is minimized to the smallest number of waypoints, required for a successful navigation of the user from an outset point to a destination point.

Figure 4B:
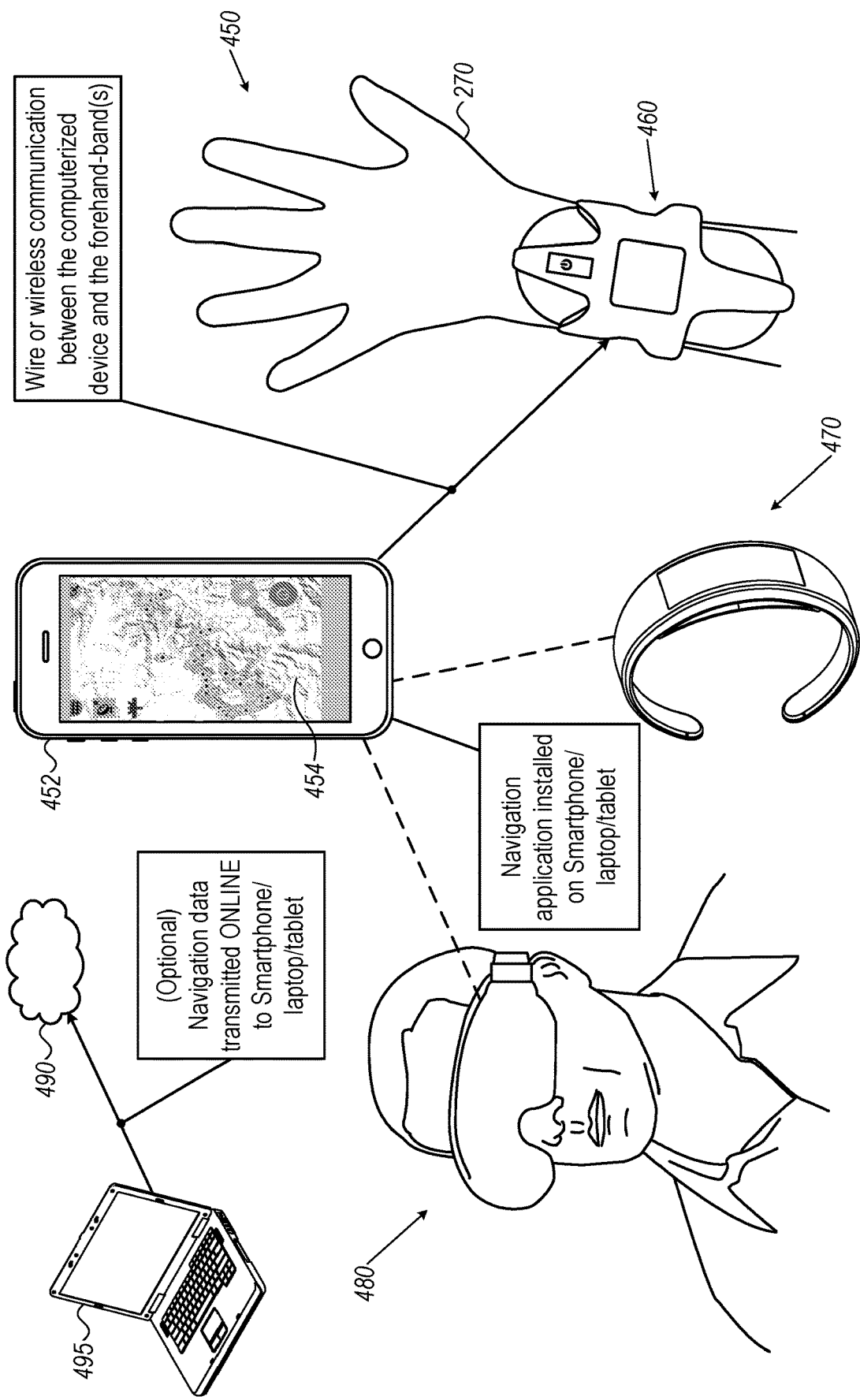

In a finish save track step 360, the track is saved in the system library, such as on computer 495 (FIG. 4B).

This fragmentation algorithm enables detection and correction of a user deviation from a continuous-line route (-prior art continuous line routes do not enable real-time correction for a user deviating from a trek as they cannot detect the deviation-they can only detect that the user has deviated when he/she fails to pin a next way-point. The next way-point might be tens or hundreds of meters away and late updating the user may be too late to prevent danger to the user). In sharp contrast to the prior art, fragmentation algorithm 350 immediately detects user deviation as user's azimuth (by noticing the changes in users position—compass) does not match that of the anticipated trek/course. In simpler words, the fragmentation algorithm enables error correction for deviation, where without it, it is not feasible. This fragmentation algorithm may be applied in GPS-enabled environments, too.

Device 400 (FIG. 4A) is suitable for use in the system of FIG. 4B. FIG. 4B shows a simplified pictorial illustration of a system 450 for navigation in a non-Global Positioning System (GPS) environment, system 450 employing cellphone 452, similar or identical to device 400, having architecture with the integration to a tactile-based navigation system 460, in accordance with an embodiment of the present invention.

System 450 connects via the internet 490, with a computer 495, such as a laptop, and/or device 452, which can communicate with tactile device 460, smartwatch 470 and a heads up display (HUD) 480.

Reference is now made to FIG. 5A, is a simplified schematic illustration of another device 500, with military or 3rd party proprietary use with 3rd party modules for navigation, being integrated with vehicles in a non-Global Positioning System (GPS) environment, in accordance with an embodiment of the present invention.

Device 500 comprises various components or sensors, such as, but not limited to, a casing 502, a screen or display 504, an accelerometer 506, a compass 508, a pedometer 510 and communications means 530, such as, but not limited to OS Android/IOS/Winmobile or other. Device 500 is configured with a BT/BLE/WiFi/RF/wire/other communication module 520, a barometer 516, a wireless/cellular network component 518, to provide full app functionality and to enable $3^{rd}$ party access to a network and Bluetooth. The device further comprises a $3^{rd}$ party speedometer data link 522 (car, autonomous vehicle, or other vehicle), a third party network connectivity element 524, a third party camera analytics SW/HW element 526 and a third party video analytics component 528.

Device 500 (FIG. 5A) is suitable for use in the systems of FIG. 5B and FIG. 5C.

FIG. 5B is a simplified pictorial illustration of a system 550 for navigation in a non-Global Positioning System (GPS) environment, in accordance with an embodiment of the present invention. System 550 comprises device 550, a HUD 580, an arm device 560 and a vehicle 591, such as a car, motorcycle, autonomous/robotic vehicle, an army vehicle, bicycle, speedboat, or any other vehicle with a speedometer. Device 500 communicates with all the other system components.

Device 500 is constructed to communicate with the vehicle and provides the vehicle's driver directions via the arm device core or HUD.

An alternative combination system is shown in FIG. 5C, which is a simplified pictorial illustration of another system 540 for navigation in a non-Global Positioning System (GPS) environment, in accordance with an embodiment of the present invention. System 540 enables device 500 to communicate via the internet 59—with a computer to enable a remote operator (when with autonomous/robotic vehicle) to receive GEO location of the vehicle and/or to control it accordingly. Additionally, the device is constructed to communicate with arm device 571 and/or HUD 580.

Another alternative combination system 501 is shown in FIG. 5D, which is a simplified pictorial illustration of another system 501 for navigation in a non-Global Positioning System (GPS) environment, in accordance with an embodiment of the present invention. System 501 comprises an arm device 560 having arms 561, vibrators 565, an on-off switch 563 and display 562. The arm device communicates with the HUD 580 and the vehicle 591. The arm device 560 has all necessary components to support navigation in a non-Global Positioning System (GPS) environment as illustrated in FIG. 7A.

Reference is now made to FIG. 6A, which is a simplified schematic illustration of another device 600 for navigation in a non-Global Positioning System (GPS) environment, in accordance with an embodiment of the present invention.

Device 600 comprises various components, such as, but not limited to, a casing 602, a screen or display 604, an accelerometer 606, a compass 608, a pedometer 610 and Operating System Software 612, such as, but not limited to OS Android/IOS/Winmobile or other. Device 600 is configured with a BT/BLE/WiFi/RF/wire/other communication module 620, a barometer 616, a wireless/cellular network component 618, to provide full app functionality and to enable $3^{rd}$ party access to a network and Bluetooth. Devices 600 (FIG. 6A) is suitable for use in the system of FIG. 6B.

Reference is now made to FIG. 6B, which is a simplified pictorial illustration of a system 650 for navigation in a non-Global Positioning System (GPS) environment, in accordance with an embodiment of the present invention. Device 661, similar or identical to device 600 (FIG. 6A) communicates via a two-way link 651 with the internet 690. The internet also communicates information via at least one second two-way link 652. In this case the device comprises a standalone (as illustrated in FIG. 7A) core with network and broadcasting capabilities to a headquarters (not shown).

Reference is now made to FIG. 7A, which is a simplified schematic illustration of a standalone device 700 for navigation in a non-Global Positioning System (GPS) environment, in accordance with an embodiment of the present invention.

Device 700 comprises various components, such as, but not limited to, a casing 702, a screen or display 704, an accelerometer 706, a compass 708, a pedometer 710 and Operating System Software 712, such as, but not limited to OS Android/IOS/Winmobile or other. Device 700 is configured with a BT/BLE/WiFi/RF/wire/other communication module 720, a barometer 716, a wireless/cellular network component 718, to provide full app functionality and to enable $3^{rd}$ party access to a network and Bluetooth (BT) 732. Device 700 (FIG. 7A) is suitable for use as device 750 of FIG. 7B. Devices 700 or 750 are constructed with upgraded components to be standalone devices, that is without the need for another portable communication device, such as a cellphone) to report to it. These devices are constructed to activate at least one non-GPS navigation App, embedded therein.

FIG. 7B shows a simplified schematic illustration of standalone device 750 for navigation in a non-Global Positioning System (GPS) environment, in accordance with an embodiment of the present invention. The device comprises arms 760, an on-off switch 763 and at least one vibration component 765.

Reference is now made to FIG. 8, which is a simplified pictorial illustration of a system 800 for navigation in a non-Global Positioning System (GPS) environment, in accordance with an embodiment of the present invention. System 800 is operative to connect an armband device 871 on an arm 870 via a first communication device 852, such as a cellphone, via the internet 890 to a second communication device 895 such as a laptop at an operation headquarters (HQ), or by sending an estimated location without GPS to web/HQ/family/social network.

The first communication device 852 may optionally be placed on a person 805. According to some embodiments, this device is placed on a central portion 852 of his/her body, proximal to or at a center of gravity 810 of the person. The location of the device is preferably along a central vertical axis 814 to enable extreme directional sensitivity of the person. Optionally, the device is placed in a holder, bag, pouch or other holdings means 812, to enable the person to be hands free.

Turning to FIG. 9, there is seen, a simplified pictorial illustration of a system 900 for navigation in a non-Global Positioning System (GPS) environment, in accordance with an embodiment of the present invention. System 900 is operative to connect a portable device 952 to smart glasses/HUD 980 and to special optical/camera equipment 990 to identify and verify the device location once identifying a landmark stored in imagery/video analytics database (see FIG. 5A).

Reference is now made to FIG. 10, which is a simplified pictorial illustration of another system 1000 for navigation in a non-Global Positioning System (GPS) environment, in accordance with an embodiment of the present invention. System 1000 is constructed and configured to connect a communication device 1052, such as a smartphone, to smart glasses/HUD 1082, to special optical/camera equipment 1099 to identify and verify the device location once identifying a landmark stored in imagery/video analytics database (see FIG. 5A). An optional armband device 1060, worn on an arm 1070, may be used in this system configuration.

Reference is now made to FIG. 11A, which is a simplified schematic illustration of another device 1100 for navigation in a three-dimensional non-Global Positioning System (GPS) environment, in accordance with an embodiment of the present invention.

Device 1100 (FIG. 11A) is suitable for use in the environment of system 1150 of FIG. 11B.

Device 1100 comprises various components, such as, but not limited to, a casing 1102, a screen or display 1104, an accelerometer 1106, a compass 1108, a pedometer 1110 and Operating System Software 1112, such as, but not limited to OS Android/IOS/Winmobile or other. Device 1100 is configured with a BT/BLE/WiFi/RF/wire/other communication module 1120, a barometer 1116, a wireless/cellular network component 1118, to provide full app functionality and to enable $3^{rd}$ party access to a network and BT 1126. Device 1100 (FIG. 11A) is suitable for use as device 1102 of FIG. 11B. Devices 1100 or 1102 are constructed with upgraded components to be standalone devices, that is without the need for another portable communication device, such as a cellphone) to report to it. These devices are constructed to activate at least one 3D mapping system/CAD 1133, embedded therein.

FIG. 11B is a simplified pictorial illustration of the device 1100 of FIG. 11A for use in three dimensional locations, such as in a multiple storey building 1152, 1154, in accordance with an embodiment of the present invention. The application algorithm uses the barometer sensor to determine the altitude of the user and thus its actual store in buildings and any other changing environment to predict a three-dimensional location of the device. The 3D location is communicated to CAD or other 3D Software systems (1133) and thus the location can be visualized on a building scheme.

FIGS. 12A and 12B are simplified schematic illustrations of a flowchart 1200 of a method for navigation in a non-Global Positioning System (GPS) environment in a free-roaming trek (lacking a fragmented route), in accordance with an embodiment of the present invention. This method is devised to work on any of the portable devices, described herein.

In an activating algorithm step 1202, a non-GPS algorithm is activated. This algorithm may be used, inter alia, in a cellphone App, which a user activates on a device, such as device 100, 200 (FIGS. 1A, 2A, respectively). The algorithm is used, inter alia, with respect to flowcharts of methods of the present invention, including, but not limited to, step 1322 (FIG. 13), step 1420 (FIG. 14), step 1522 (FIG. 15) and step 1618 (FIG. 16). Many similar examples of methods are deemed to be within the scope of the present invention.

In a user trait's obtaining step 1204, the algorithm is constructed and configured to obtain:

a) User traits: user height, weight, age, gender, data on carrying weight (e.g. backpack) as illustrated in FIG. 21 and FIG. 22 and an indication of whether the user is "in track" or in "free navigation"; and b) User's strides' characteristics: in slow, normal, jogging and running speeds and under various conditions as illustrated in FIG. 24.

In a sensor data obtaining step 1206, the algorithm is constructed and configured to obtain data from sensors on the device. These sensors are those described with respect to the device drawings herein:
   i. compass: obtain orientation;
   ii. accelerometer: obtain movement direction;
   iii. pedometer: obtain steps count;
      and optionally
   iv. barometer: obtain pressure/altitude;
   v. vehicle connector/API: obtain vehicle data from vehicle computer or other reporting components/elements (i.e. speedometer); and
   vi. camera: obtain image and video analytics regarding location match.

In a calculate new geo point location step 1208, the algorithm is constructed and configured to determine a new user location.

It performs this by tracking the user in motion, such as, but not limited to, walking, slow motion, jogging, running, driving, diving, swimming and combinations thereof. This function calculates the distance passed according to the time, stride length, user subjective/personalized data and sensors data, if available in order to determine the user's walking speed.

The algorithm is further constructed and configured to obtain a speed factor, this function applies to walking, slow motion, jogging, running, driving, diving, swimming, etc. This function calculates the distance passed according to the time, stride length, user subjective/personalized data and sensors' data if available) in order to determine a user's speed factor.

Thereafter, in a calculate the user's factors step 1210, the algorithm is constructed and configured to determine the real-time walking speed and speed factors, associated with the user.

Based on the above factors, the algorithm then determines a new GEO position of the user in a determining user position step 1212.

In a device updating step 1224, the algorithm then sends the user position data to any device in use, such as:
   a) updating a user interface, such as tactile devices-, arm device 260; Head's Up Display HUD 580, Wearable devices and IOT devices. e.g. smart watch 280, in an updating user interface step 1226,
   b) updating a database with the new user position in an updating database step 1230;
   c) updating external devices or systems in an updating external devices step 1228, including, but not limited to the internet 490, server and or cloud bases systems. e.g. social networks, command and control (c2) systems, mapping services, and 3D CAD and mapping systems to present user's position at a 3D environment. e.g. multiple stories building.

It should be noted that the non-GPS roaming algorithm 1200 enables a user roaming along an "unplanned" route to correct user positional data in real-time.

It should be further noted that the non-GPS roaming algorithm 1200, according to some embodiments, enables a user roaming along an "unplanned" route to correct user positional data in semi-continuously in real-time.

It should be further noted that the non-GPS roaming algorithm 1200, according to some additional embodiments, enables a user roaming along an "unplanned" route, to provide the user with correct user positional data in continuously in real-time.

The non-GPS roaming algorithm 1200 of the present invention provides real-time location definition of a user device within 100 meters, 50 meters, 10 meters, 5 meters, 1 meter or within 20 cm of a correct map position.

The non-GPS roaming algorithm 1200 of the present invention provides real-time location definition of a user within 100 meters, 50 meters, 10 meters, 5 meters, 1 meter or within 20 cm of a correct map position.

Reference is now made to FIG. 13, which is a simplified flowchart 1300 of a method for navigation in a preset walking route in a non-Global Positioning System (GPS) environment, in accordance with an embodiment of the present invention.

In an activating application step 1302, a user switches on a device, such as device 100, 200 and the user activates a navigational application (App) installed on the device.

The App checks if there is GPS service available in a GPS checking step 1304.

If no GPS service is detected, then the user manually loads a Track in a loading walking present route/track step 1306 in the App.

Thereafter, in a setting user location step 1308, the user sets his location manually. This may be performed in one of two ways: a) by pinning the map on-screen or b) by inserting his/her numerical coordinates onto a popup screen (FIG. 20).

The user starts navigation from waypoint to waypoint (see fragmentation algorithm in FIG. 3B and FIGS. 17 and 23) in a navigation step 1310 using the device(s) as described herein.

If there is a GPS service in step 1304 on the device, then the GPS service is operative to provide a location lock of user's position, in a user's positioning determining step 1312.

Thereafter, the user loads a preset track/course in a loading track step 1314.

The user starts navigation from waypoint to waypoint (See fragmentation algorithm, see FIGS. 17 and 23) in a navigation step 1316 using the device(s) as described herein.

In a users' measurement movement step 1318, the navigational App is configured to count and measure the steps/strides of the user and to determine his/her altitude, bearing and new position.

In another GPS service detecting step 1320 (repeatedly performed), the device checks to see if there is a GPS service available. If yes, then the App is operative to ignore the outputs of step 1318 in an ignoring App outputs step 1328.

After some time, the user's position is changed, due to GPS detection of location change of the user in another GPS location determining step 1330.

The GPS service is then operative to update a new position of the user to arm device 260 and/or to a screen 104, 204, smart watch 280 or to any other device described herein in an updating position step 1332.

Returning to step 1320, if no GPS service is available, the GPS-denied algorithm (also termed non-GPS or GPS-denied algorithm 1200 (FIG. 12) is activated in an algorithm activating step 1322.

After some time, a geographic (GEO) position of the user changes since the user has moved after the period of time, in a moving GEO position 1324.

The non-GPS algorithm 1200 (FIG. 12) is then operative to update a new position of the user to arm device 260 and/or to a screen 104, 204, smart watch 280 or to any other device described herein in an updating position step 1326.

Steps 1304-1332 are repeated as required throughout the preset route until the user reaches the last waypoint (his/her destination) in a reaching last waypoint step 1324.

The user receives an indication or notification on his/her device or arm device to indicate that the track is completed in a finishing track notification step 1336.

The user then closes or exits the App in an exit step 1338.

Reference is now made to FIG. 14, which is a simplified flowchart 1400 of a free-roaming walking method where there is no pre-set route/course available for navigation in a non-Global Positioning System (GPS) environment, in accordance with an embodiment of the present invention.

In an activating application step 1402, a user switches on a device, such as device 100, 200 and the user activates a navigational application (App) installed on the device.

The App checks if there is GPS service available in a GPS checking step 1404.

If no GPS service is detected, then the user sets a setting user location step 1406, the user sets his location manually. This may be performed in one of two ways: a) by pinning the map on-screen or b) by inserting his/her numerical coordinates onto a popup screen (FIG. 20).

The user starts navigation/walking in a navigation step 1408 using the device(s) as described herein.

If there is a GPS service in step 1404 on the device, then the GPS service is operative to provide a location lock of user's position, in a user's positioning determining step 1410.

The user starts navigation or simply walking in a navigation step 1412 using the device(s) as described herein.

In a strides, counting step, bearing and altitude determination step 1416, the navigational App is configured to count and measure the steps/strides of the user and to determine his/her altitude, bearing and new position.

In another GPS service detecting step 1418 (repeatedly performed), the device checks to see if there is a GPS service available. If yes, then the App is operative to ignore the outputs of step 1416 in an ignoring App outputs step 1426.

After some time, the user's position is changed, due to GPS detection of location change of the user in another GPS location determining step 1428.

The GPS service is then operative to update a new position of the user to arm device 260 and/or to a screen 104, 204, smart watch 280 or to any other device described herein in an updating position step 1430.

Returning to step 1418, if no GPS service is available, the GPS-denied algorithm (also termed non-GPS or GPS-denied algorithm 1200 (FIG. 12) is activated in an algorithm activating step 1420.

After some time, a geographic position of the user changes since the user has moved after the period of time, in a moving GEO position step 1422.

The non-GPS algorithm 1200 (FIG. 12) is then operative to update a new position of the user to arm device 260 and/or to a screen 104, 204, smart watch 280 or to any other device described herein in an updating position step 1424.

Steps 1404-1430 are repeated as required throughout the free roaming of the user until the user reaches his/her destination in a reaching destination step 1432.

The user then closes or exits the App in an exit step 1434.

Reference is now made to FIG. 15, which is a simplified flowchart 1500 of a method for navigation in a preset driving route/course in a vehicle (driven or autonomous) in a non-Global Positioning System (GPS) environment, in accordance with an embodiment of the present invention.

In an activating application step 1502, a user switches on a device, such as device 100, 200 and the user activates a navigational application (App) installed on the device.

The App checks if there is GPS service available in a GPS checking step 1504.

If no GPS service is detected, then the user manually loads a Track in a loading driving present route/track step 1506 in the App.

Thereafter, in a setting user location step 1508, the user sets his location manually. This may be performed in one of two ways: a) by pinning the map on-screen or b) by inserting his/her numerical coordinates onto a popup screen (FIG. 20).

The user starts navigation from waypoint to waypoint (see fragmentation algorithm FIG. 3B, FIGS. 17 and 23) in a navigation step 1510 using the device(s) as described herein.

If there is a GPS service in step 1504 on the device, then the GPS service is operative to provide a location lock of user's position, in a user's positioning determining step 1512.

Thereafter, the user loads a preset driving track/course in a loading track step 1514.

The user starts driving navigation from driving waypoint to waypoint (See fragmentation algorithm, FIG. 3B, see also FIGS. 17 and 23) in a driving navigation step 1516 using the device(s) as described herein.

In a determining vehicle's speed (see FIG. 5A, 522), altitude and bearing step 1518, the navigational App is configured to determine the vehicle's speed (vehicle's speedometer (see FIG. 5A, 522)) of the user and to determine the vehicle's altitude, bearing and new position.

In another GPS service detecting step 1520 (repeatedly performed), the device checks to see if there is a GPS service available. If yes, then the App is operative to ignore the outputs of step 1518 in an ignoring App outputs step 1528.

After some time, the vehicles position is changed, due to GPS detection of location change of the user in another GPS location determining step 1530.

The GPS service is then operative to update a new position of the vehicles to arm device 260 and/or to a screen 104, 204, smart watch 280 or to any other device described herein in an updating position step 1532.

Returning to step 1520, if no GPS service is available, the GPS-denied algorithm (also termed non-GPS or GPS-denied algorithm 1200 (FIG. 12) is activated in an algorithm activating step 1522.

After some time, a geographic position of the vehicle changes since the user had driven it after the period of time, in a moving GEO position step 1524.

The non-GPS algorithm 1200 (FIG. 12) is then operative to update a new position of the user (in his vehicle) to arm device 260 and/or to a screen 104, 204, smart watch 280 or to any other device described herein in an updating position step 1526.

Steps 1504-1532 are repeated as required throughout the preset driving route until the user reaches the last waypoint (his/her destination) in a reaching last waypoint step 1524.

The user receives an indication or notification on his/her device or arm device to indicate that the track is completed in a finishing track notification step 1536.

The user then closes or exits the App in an exit step 1538.

Reference is now made to FIG. 16, which is a simplified flowchart 1600 of a free roaming in a vehicle (driven or autonomous) driving method where there is no pre-set route/course available for navigation in a non-Global Positioning System (GPS) environment, in accordance with an embodiment of the present invention.

In an activating application step 1602, a user switches on a device, such as device 100, 200 and the user activates a navigational application (App) installed in the device.

The App checks if there is GPS service available in a GPS checking step 1604.

If no GPS service is detected, then the user sets a setting user location step 1606, the user sets his location manually. This may be performed in one of two ways: a) by pinning the map on-screen or b) by inserting his/her numerical coordinates onto a popup screen (FIG. 20).

The user starts navigation/driving in a driving step 1608 using the device(s) as described herein.

If there is a GPS service in step 1604 on the device, then the GPS service is operative to provide a location lock of user's position, in a user's positioning determining step 1610.

The user starts navigation/driving in the area in a navigation step 1612 using the device(s) as described herein.

In a determining vehicle's speed, altitude and bearing step 1614, the navigational App is configured to determine the vehicle's speed ((see FIG. 5A, 522), see connection to vehicle's speedometer) of the user and to determine the vehicle's altitude, bearing and new position.

In another GPS service detecting step 1616 (repeatedly performed), the device checks to see if there is a GPS service available. If yes, then the App is operative to ignore the outputs of step 1616 in an ignoring App outputs step 1624.

After some time, the position of the vehicle of the user is changed, due to GPS detection of location change of the user in another GPS location determining step 1626.

The GPS service is then operative to update a new position of the user to arm device 260 and/or to a screen 104, 204, smart watch 280 or to any other device described herein in an updating position step 1628.

Returning to step 1616, if no GPS service is available, the GPS-denied algorithm (also termed non-GPS or GPS-denied algorithm 1200 (FIG. 12) is activated in an algorithm activating step 1618.

After some time, a geographic position of the user changes since the user has moved after the period of time, in a moving GEO position step 1620.

The non-GPS algorithm 1200 (FIG. 12) is then operative to update a new position of the user to arm device 260 and/or to a screen 104, 204, smart watch 280 or to any other device described herein in an updating position step 1622.

Steps 1604-1628 are repeated as required throughout the free roaming driving route of the user until the user reaches his/her destination in a reaching destination step 1630.

The user then closes or exits the App in an exit step 1632.

FIG. 17 shows a simplified schematic illustration of a route after its processing by the fragmentation algorithm (right-hand side) 1720, versus a prior art where the route is a continuous line course (left-hand side) map 1700, showing some features and a route from point A to B, in accordance with an embodiment of the present invention. The original course (1700), prior to its fragmentation, may be imported from a 3$^{rd}$ party mapping and routing service; or sent to user by others; or may be recorded while in free-roaming mode (Figs. 1400, 1600) navigation in current application; or may be created originally-fragmented in current invention.

The application employs an innovative fragmentation algorithm to segment a continuous-line course 1704 (e.g. a GPX file format) from a starting point 1702 to a destination 1704 via a continuous line route, into a fragmented, straight, clear, bearings stretched between clear waypoints 1721, 1722, 1723, . . . 1789, 1790, 1791 etc., and thus to enable easy following of azimuths (bearings) between the waypoints, and to provide the user with heading instructions such as, but not limited to, "turn 22.5 degrees left", "turn 45 degrees to the right".

The fragmentation algorithm creates clear bearings and thus enables the provisioning of clear instructions to the user, integrating wearable device (head-up-display glasses, tactile bands, arm device etc.) such that the application provide a hands-free navigation experience for the user.

Reference is now made to FIG. 18, which is a simplified schematic illustration of a waypoint naming feature screenshot 1800, in accordance with an embodiment of the present invention. The screen shot enables the user to enter a name 1852, such as "home", as seen on screenshot 1850.

The application enables the user to name waypoints with descriptive names and thus to assist him in identifying waypoints' landmarks in order to pin his actual location, to them. If necessary, the user can thus zero the distance count and thus to prevent the exponential deviation of distance.

FIG. 19 is a simplified schematic illustration of a pinning screen 1902 ("Set Landmark") 1900, on a tactile wearable device, 100, 200 which zeros a distance measurement, in accordance with an embodiment of the present invention. A user can set a bearing latitude 1904, longitude 1906, and/or landmark 1908, thereby enabling a self-location definition, in accordance with an embodiment of the present invention.

FIG. 19 is a simplified schematic illustration of a pinning screen ("Set Landmark"), on a tactile wearable device, which zeros a distance measurement, in accordance with an embodiment of the present invention;

FIG. 20 is a simplified schematic illustration of a screen shot 2000 on a device application screen or on other interfaces screens (HUD, Smartwatch, Wearable, etc.) 100, 200 with manual location setting as described in 1308, 1406, 1508, 1606, on a map 2004, in accordance with an embodiment of the present invention. The user can set his location manually. This may be performed in one of two ways: a) by pinning the map on-screen or b) by inserting his/her numerical coordinates onto a popup screen location 2002, pinned into map 2004. After the location setting, the user's contemporary coordinates will popup when clicking on a location indicator 2005—the arrow.

Reference is now made to FIG. 21, which is a simplified schematic illustration of a screen shot 2100 of further personalization options setting screen 2102, in accordance with an embodiment of the present invention. The user can input, his height, 2103, if the trek is performed with heavy lifting (yes/no) 2104, the required tolerance (radius of the waypoint) of a waypoint 2106 and many other options (not shown for simplicity).

FIG. 22 is a simplified schematic illustration of a screen shot 2200 of further personalization options inputting screen 2202, such as a personal height inputting button and/or slide 2206, in accordance with an embodiment of the present invention.

Reference is now made to FIG. 23, which is a simplified schematic illustration of a screen shot 2300 of a user 2310 navigating on a fragmented (FIG. 17) preset course (FIGS. 15, 13), in accordance with an embodiment of the present invention.

A user sets out from a starting waypoint 2301, on a closed circuit trek, and navigates along bearing course 2302 to a first waypoint 2304, and then instructed by interface (HUD, Wearable, etc.) to turn "right 90 degrees" to waypoint 2306 and then to the next waypoint till the last waypoint 2314, proximal to or overlapping the starting waypoint.

FIG. 24 is a simplified schematic illustration of a screen shot 2400 of personalized speed adjustment factors, such as a slow speed 2402, a normal speed 2402, a jog speed 2406 and a running speed 2408, in accordance with an embodiment of the present invention.

When a GPS signal is lost, such as under covered areas (e.g. shopping malls, woods, urban, airports, etc.), or in military settings where the user's area of operation is jammed by Electronic Warfare ((Hereafter, EW), the application, either by in-app notification or by a wearable interface notifications (tactile sensation, or Head Up Display popup), will provide the user with a "PROBLEM" warning to indicate that the signal is lost, and the NON-GPS Navigation service initiates.

The user may also shut the GPS service, by its own will, of the computerized device, and the NON-GPS Navigation service will be initiated

BEST MODES OF IMPLEMENTATION

The present invention provides systems and methods for intuitive navigation in GPS-denied environments and thus is best implemented in the following examples of navigation modes:

Sport/Extreme Navigation (Day/Night)
a. Sport navigation—The user is subjected to time constraints, harsh field conditions and the elements.
b. Hiking—The user is subjected to harsh field conditions and the elements and carries heavy equipment.
c. Hunting—The user is subjected to harsh field conditions and the elements, carries heavy equipment and needs to be attentive to the surroundings.
d. Wind surfing—The user is subjected to waters conditions, the elements (and sometimes time constrains), holding and steering the board and needs to be attentive to the surroundings
e. Kayaking—The user is subjected to waters conditions, the elements (and sometimes time constrains), holding and steering the board and needs to be attentive to the surroundings.
f. On/Off-road Running—The user is subjected to time constrains, complex and/or harsh road/track conditions and the elements.
g. On/Off-road Cycling—The user is subjected to road/track conditions, the elements and time constrains, holding and steering the bicycle and needs to be attentive to the surroundings.
h. Mountain climbing—The user is subjected to harsh field conditions and the elements, carries heavy equipment and needs to be attentive to the surroundings.
    i. Military navigation (Day/Night)—
j. The user is subjected to harsh field conditions and the elements, carries heavy equipment, time constrains, needs to be attentive to the surroundings and to stealth requirements
    k. Assisting visually-disabled/blind users
l. A visually disable or blind person may find the systems and devices of the present invention very useful in assisting him/her in getting around. The user is subjected to varied terrains and needs to be attentive to the surroundings.
    m. Casual urban navigation
n. The user is in an unknown area, maze-like streets, time constrains, usually is an inexperienced navigator.
o. The user is subjected to the elements, carries equipment, time constraints, needs to be attentive to the surroundings.
    p. Dog handling and direction
q. Visually-impaired user support—the current practice of a guide dog supporting a visually impaired person is primarily of helping the person to avoid obstacles. With a device of the present invention placed on the dog's back, and with basic training, the dog may now lead the visually impaired person to its destination and thus to become a complete solution of both leading and guiding.
r. Police, rescue and military support—the current practice of a sending a dog to a remote task is by either walking next to it or by placing a camera and speaker from which the handler is commanding the dog: Walking next to it—places the human handler in harm's way and thus undermine the reason for the usage of police/military dogs. The prior art practice of placing a camera and speaker on a dog is as with human navigators. The practice employs sound directions, on which the dog should rely. These employ weak, easily disrupted, senses, such as vision and sound. These result in a navigation experience that is demanding and subjected to environmental disturbances.
s. With a device of the present invention device placed on the dog's back, and with basic training, the dog may now be directed to the destination without a human escort or by the easy to be disrupted sound directions.
    t. Memory-disabled user support (e.g. Alzheimer's Disease)
u. Weary or memory-disabled people may be supported by the device of the present invention. There is no need to remember the way home. Simply wear it on the forearm and be led home.

The systems of the present invention overcome the prior art requirements for auditory directions, as well as the requirement to hold and read a physical map in practice. Moreover, using the systems of the present invention, there is no longer a need for sound directions. Thus the user, does not need to focus and listen to the instructions while at a noise-hectic environment (from radio communication, conversations, potential threats, targets, animals in hunting, the weather, and even music, in the case of some athletes).

In sharp contrast with the prior art (GPS-enabled) devices, the "GPS-independent" devices and systems of the present invention guide and lead the user thereof, such as a hiker, hunter, athlete or soldier, sight-disabled person, to his/her destination without distractions, as well as with optimized considerations to the extreme circumstances and conditions the user is experiencing.

The forearm wearable navigation devices of the present invention, separate, distinguish, differentiate and simplify the navigation indications/instructions to the user and thus creating an intuitive navigation experience.

The devices of the present invention provide sensation-based directions. As illustrated herein, there are micro-vibrators placed on the tip of each directional arm. The vibrations are ergonomically funneled to a specific point on the users forearm, resulting in a feel of a firm pointed touch on the skin, as if someone were poking the user's skin. The device also provides one or more visual indications, which can be disabled, by embedded LED emitters in each directional arm.

Materials of construction of the device—there are several cover ("shell") types. textile, silicone, rubber or a combination thereof. These provide the device with flexibility, durability, water resistance, light-weight and a slick look.

Integration to external devices:—the unique vibrations' language, created by the systems of the present invention, enables creation of additional alerts to indicate of additional scenarios and necessities. For example, alerting on a too fast heart's pulse-rate will alert the user by a slow pace vibration, instructing him/her to slow down.

Cellphone Applications of the Present Invention

A propriety smartphone application which is adaptable to Android, iPhone/MS Mobile or other Operational Systems is installed on the communication computerized device.

Accordingly, the portable/wearable device is configured to seamlessly support and communicated with all of these platforms.

1. The app is based on a suitable map SDK or an open-source application such as Google Maps.
2. The app supports Terrain Map, off-road routes, satellite images, etc.
3. The app supports free-hand routing: the Navigator may draw his own route and navigate according to his route, including pre-defined waypoints
4. Navigation routes can be shared with social networks
5. The route may be saved on the device and then be operated without internet connectivity
6. The map and route may be imported from the web or from saved files on a removable secure digital (SD) card.
7. The app supports creating on-the-go landmarks (Touch-and-Go on a button on the device)
   a. Places a pin on the map
   b. Can be shared with social networks
   c. As a landmark is set, there is an indication by an all-around-vibration and by a light on the center LED.
      i. The app is connected to the physical device—the forearm navigation band—by P2P wifi or Bluetooth
      ii. The app provides data to the device that is presented on its screen, such as, but not limited to a current time, compass, azimuth, temperature (C or F), altitude (measurements—US or Eu, set in apps' settings), longitude/latitude, speed, terrain/route steepness (elevation profile), distances, from start point, from last waypoint, to next waypoint and to last waypoint/destination, time from start point, from last waypoint, to next waypoint and to last waypoint/destination.

The app is constructed to receive data from the device, such as, but not limited to, receive location trigger data to create a landmark. When a landmark is set, a waypoint is created on the route and there is an indication, such as a green LED, which blinks.

8. Based on the speed of the walk/run, the app alerts the user a bit before a required turn in order for him not to miss the turn—with several short vibration flicks and light flicks on the relevant directional device's arm
9. The app store (recorded) historic navigation data such as trail, time, duration, average duration per section if the trek.
10. The app supports all relevant features relevant for navigation provided by the SDK.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A portable navigation GPS-independent method for provision of personalized navigation indications to a user in a non-GPS environment, the method comprising:
   a. activating a navigation Application (App) provides the user with a non-GPS navigation service configured to provide navigational indications associated with a route in the non-GPS environment, responsive to at least one of a current position of said user; and a personalized profile of said user;
   b. instructing at least one direction-specific instruction of movement to the user; and
   c. updating said user in real-time responsive to a deviation of said user from said route, wherein the user is mobile without a vehicle and wherein said route is selected from a preset route and a free roaming trek.

2. A method according to claim 1, further comprising providing said indications and instructions in terrain and off-road routes in said non-GPS environment.

3. A method according to claim 2, wherein said instructing step is performed by at least one device, disposed in an anterior central position on a body of said user and wherein said at least one device comprises at least one of a computerized device, portable phone, an armband device, a heads-up device, a smart glasses device, a cell phone, a smart watch, smart glasses, a heads up display (HUD), an optical apparatus, binoculars, camera equipment, a smart phone, a tablet, a laptop computer, a mobile communication apparatus, a portable communication apparatus, a radio phone and an army phone and combinations thereof.

4. A method according to claim 3, further comprising:
   a. correcting erroneous data generated by sensors in said at least one device;
   b. detecting at least one of:
      i. orientation changes performed by the user;
      ii. an angle falling within a predefined angle range;
      iii. a distance falling within a predefined distance range:
      iv. changes in tempo of movement selected from slow walking, walking, jogging, running and combinations thereof; and
   c. integrating these changes into measurements.

5. A portable navigation method according to claim 4, further providing a precise location to said user on at least one of a trek, where there is a pre-planned route, a free route/roaming trek, a 2-dimensional navigation, a 3-dimensional navigation, and combinations thereof.

6. A method according to claim 5, further comprising providing continuously or semi-continuously:
   i. corrected faulty measurements of said at least one sensor;
   ii. detected changes in a stride length of said user;
   iii. detected changes in an orientation of said user;
   iv. detected changes in a performance of said user; and
   v. detected change in a tempo of movement of said user, thereby continuously or semi-continuously updating said user location.

7. A method according to claim 6, further providing real-time personalized feedback and instructions to said user to minimize user deviation from said route, and wherein said user is selected from a human and a dog.

8. A method according to claim 7, wherein said personalized feedback and said instructions are responsive to:
   a. a speed of said user;
   b. a movement type of said user; and wherein said personalized feedback calculated by tracking said user in a motion, selected from walking, slow motion, jogging, running, driving, diving, swimming and combinations thereof.

9. A method according to claim 8, further comprising comparing real-time data associated with a real-time location of the at least one device with an anticipated location of the at least one device to provide the user with updated real-time instructions, responsive to said real-time data and said anticipated location.

10. A portable navigation method according to claim 1, further comprising segmenting a continuous-line course from a starting waypoint to a destination waypoint via a continuous line route, into a fragmented, straight, clear, bearings stretched between clear waypoints, to provide the user with easy following of azimuths between the waypoints.

11. A method according to claim 1, further comprising storing a personalized profile of said user and optionally storing multiple user profiles.

12. A hands-free method for provision of navigation indications to a user in a non-GPS environment, the method comprising:
  i. providing the user with navigational instructions in the non-GPS environment; and
  ii. instructing at least one direction-specific tactile instruction of movement to the user; and
  iii. fragmenting a continuous line course on a map associated with a two or three-dimensional route, thereby providing real-time instructions to said user in an anterior central position of a body of said user, responsive to a current position of said user on said route; and optionally
  iv. updating said instructions responsive to a deviation of said user from said route in real-time, and providing the user with a distance, a direction, and a description of a next way point.

13. A method according to claim 12, enabling improved user navigation accuracy by enabling said user to name waypoints with descriptive names and to upload said names to said App and for said App to check if said descriptive names are on said route.

14. A method for provision of personalized GPS-independent navigation indications to a user roaming in a non-GPS environment, the method comprising:
  i. providing a user with personalized GPS-independent navigational instructions responsive to at least one of a current position of said user; and a personalized profile of said user; and
  ii. instructing at least one direction-specific instruction of movement to the user; and
  iii. applying a non-GPS roaming algorithm, the algorithm constructed to provide instructions to said user, responsive to a current position of at least one device, wherein said at least one device is adapted to provide commands from said algorithm to activate at least one interface components, responsive to a position of said at least one device, and wherein said non-GPS roaming algorithm is configured to provide a real-time location definition of a user device within 100 meters, 50 meters, 10 meters, 5 meters, 1 meter or within 20 cm of a correct map position.

15. A method according to claim 14, which enables vehicle navigation without GPS, independent of external indications from an external information source, the method comprising:
  a. monitoring vehicle speed with a vehicle speed sensor;
  b. providing said with navigational indications associated with said route from a navigational App,
  wherein said App is constructed to provide navigation indications to said user in real-time, and to receive real-time data from said vehicle speed sensor responsive to a current position of said device associated with said route, and wherein said App is configured to update said at least one of said navigation indications responsive to a deviation of said user from said route in real-time, and further wherein said App supports terrain maps and off-road routes.

16. A method according to claim 15, wherein said vehicle is selected from a car, boat, tank a car, motorcycle, autonomous/robotic vehicle, an army vehicle, bicycle, speedboat, or any other vehicle.

17. A method according to claim 16, further comprising fragmenting said route of said user, to reduce deviation, errors and mistakes on the route of the user, and further segmenting a continuous line course to straight, clear, bearings between waypoints and thus to enable the user easy following of azimuths (bearings) between waypoints, and to provide the user with heading instructions.

18. A method according to claim 17, further comprising parsing a track created by a third party navigation, by GIS software or by free drawing which require fragmentation in order to provide the user with real-time bearing directions and instruction.

19. A method according to claim 14, further comprising remotely monitoring, commanding and controlling said at least one device.

20. A computer storage medium having instructions encoded therein for providing of personalized GPS-independent navigation indications to a user in a non-GPS environment, the medium comprising:
  a. code for providing the user with navigational indications associated with a route in the non-GPS environment responsive to at least one of a current position of said user and a personalized profile of said user;
  b. code for instructing at least one direction-specific instruction of movement to the user; and
  c. code for updating said user in real-time responsive to a deviation of said user from said route.

* * * * *